(12) United States Patent
Guha et al.

(10) Patent No.: US 8,266,148 B2
(45) Date of Patent: Sep. 11, 2012

(54) METHOD AND SYSTEM FOR BUSINESS INTELLIGENCE ANALYTICS ON UNSTRUCTURED DATA

(75) Inventors: Aloke Guha, Louisville, CO (US); Joan Wrabetz, Long Lake, MN (US); Shumin Wu, Westminster, CO (US); Venky Madireddi, San Ramon, CA (US)

(73) Assignee: Aumni Data, Inc., Long Lake, MN (US)

( * ) Notice: Subject to any disclaimer, the term of this patent is extended or adjusted under 35 U.S.C. 154(b) by 301 days.

(21) Appl. No.: 12/587,492

(22) Filed: Oct. 7, 2009

(65) Prior Publication Data

US 2010/0114899 A1  May 6, 2010

Related U.S. Application Data

(60) Provisional application No. 61/103,492, filed on Oct. 7, 2008, provisional application No. 61/278,389, filed on Oct. 6, 2009.

(51) Int. Cl.
*G06F 7/00* (2006.01)
*G06F 17/30* (2006.01)
(52) U.S. Cl. .................... 707/737; 707/741
(58) Field of Classification Search ............ 707/741, 707/737
See application file for complete search history.

(56) References Cited

U.S. PATENT DOCUMENTS

| | | | |
|---|---|---|---|
| 6,250,930 B1 | 6/2001 | Mintz | |
| 6,360,216 B1 | 3/2002 | Hennessey et al. | |
| 6,564,202 B1 * | 5/2003 | Schuetze et al. | 707/999.002 |
| 6,694,307 B2 | 2/2004 | Julien | |
| 6,697,998 B1 | 2/2004 | Damerau et al. | |
| 6,968,338 B1 * | 11/2005 | Gawdiak et al. | 707/741 |
| 7,194,483 B1 * | 3/2007 | Mohan et al. | 707/600 |
| 7,389,306 B2 * | 6/2008 | Schuetze et al. | 707/602 |
| 7,395,256 B2 * | 7/2008 | Ji et al. | 707/737 |
| 7,409,393 B2 | 8/2008 | Gregoire et al. | |
| 7,630,946 B2 | 12/2009 | Acharya | |
| 7,634,467 B2 | 12/2009 | Ryan et al. | |
| 7,647,335 B1 | 1/2010 | Colecchia | |
| 7,657,506 B2 | 2/2010 | Levin | |
| 7,809,726 B2 * | 10/2010 | Flanagan | 707/737 |

(Continued)

FOREIGN PATENT DOCUMENTS

WO    WO 2009/009192    1/2009

OTHER PUBLICATIONS

Application and File History of U.S. Appl. No. 12/105,598, Inventors Guha et al., filed Apr. 18, 2008.

(Continued)

*Primary Examiner* — Yicun Wu
*Assistant Examiner* — Pavan Mamillapalli
(74) *Attorney, Agent, or Firm* — Patterson Thuente Christensen Pedersen, P.A.

(57) ABSTRACT

Various embodiments of the present invention disclose a method for Business Intelligence (BI) metrics on unstructured data. Unstructured data is collected from numerous data sources that include unstructured data as ingested data. The ingested data is indexed and represents hyperlink and extracted data and metadata for each document. Thereafter, the ingested data is automatically classified into one or more relevance classes. Further, numerous analytics are performed on the classified data to generate business intelligence metrics that may be presented on an access device operated by a user.

15 Claims, 13 Drawing Sheets

U.S. PATENT DOCUMENTS

| | | | |
|---|---|---|---|
| 7,813,919 B2 * | 10/2010 | Goutte | 704/9 |
| 7,853,595 B2 * | 12/2010 | Chew et al. | 707/741 |
| 7,890,514 B1 | 2/2011 | Mohan et al. | |
| 7,912,816 B2 | 3/2011 | Guha et al. | |
| 2002/0143755 A1 | 10/2002 | Wynblatt et al. | |
| 2005/0108256 A1 | 5/2005 | Wakefield et al. | |
| 2006/0026114 A1 | 2/2006 | Gregoire et al. | |
| 2006/0161531 A1 | 7/2006 | Khandelwal et al. | |
| 2007/0011134 A1 | 1/2007 | Langseth et al. | |
| 2007/0112714 A1 * | 5/2007 | Fairweather | 706/46 |
| 2008/0027893 A1 | 1/2008 | Cavestro et al. | |
| 2008/0189163 A1 | 8/2008 | Rosenberg et al. | |
| 2008/0263029 A1 | 10/2008 | Guha et al. | |
| 2009/0157812 A1 | 6/2009 | Bavly et al. | |
| 2009/0164416 A1 | 6/2009 | Guha et al. | |
| 2011/0231372 A1 | 9/2011 | Wrabetz et al. | |

OTHER PUBLICATIONS

Application and File History of U.S. Appl. No. 12/331,363, Inventor Guha, filed Dec. 9, 2008.

Application and File History of U.S. Appl. No. 13/052,856, Inventor Wrabetz et al., filed Mar. 21, 2011.

Lucene, aquired at: http://lucene.apache.org/, the Apache Software Foundation, 2007, 4 pages.

Xiaojin Zhu, "Semi-Supervised Learning Tutorial," International Conference on Machine Learning (ICML), Jun. 2007, 156 pages.

T. Joachims, et al., Search Engines that Learn from Implicit Feedback, IEEE Computer, IEEE Computer, vol. 40, No. 8, Aug. 2007, 7 pages.

D. Eck, et al., "Autotagging Music Using Supervised Machine Learning," 8th International Conference on Music Information Retrieval (ISMIR), Sep. 2007, 2 pages.

F. Radlinski, et al. "Active Exploration for Learning Rankings from Clickthrough Data," Proceedings of the ACM Conference on Knowledge Discovery and Data Mining (KDD), ACM, Aug. 2007, 10 pages.

M. Hearst, "Clustering versus Faceted Categories for Information Exploration," Communications of ACM, Apr. 2006, pp. 59-61.

C.J.C. Burges, "A Tutorial on Support Vector Machines for Pattern Recognition, Data Mining and Knowledge Discovery," 2, 121-167, Kluwer Academic Publishers, Boston, 1998, 47 pages.

David M. Blei, et al., "Latent Dirichlet Allocation," Journal of Machine Learning Research 3 (2003), pp. 993-1022.

PCT/US08/060755, filed Apr. 18, 2008, Applicant Aumni Data, Inc., Written Opinion dated Mar. 31, 2009, 4 pages.

PCT/US08/060755, filed Apr. 18, 2008, Applicant Aumni Data, Inc., Search Report dated Mar. 31, 2009, 2 pages.

* cited by examiner

METHOD AND SYSTEM FOR BUSINESS INTELLIGENCE ANALYTICS ON UNSTRUCTURED DATA

RELATED APPLICATIONS

This application claims priority under 35 U.S.C. §119 to the following applications, hereby incorporated by reference, as is set forth in full in this application: U.S. Provisional Application No. 61/103,492, titled 'Business Intelligence Analytics On Unstructured Data', filed on Oct. 7, 2008 and U.S. Provisional Application 61/278,389, titled 'Business Intelligence Analytics On Unstructured Data', filed on Oct. 6, 2009.

BACKGROUND

Various embodiments of the present invention relate generally to Business Intelligence (BI) and more specifically to a method and system for BI metrics on data collected from multiple data sources that may include unstructured data.

BI refers to technologies, applications and practices for collection, integration, analysis, and presentation of content such as business information. Current BI applications collect content from various information sources such as newspapers, articles, blogs and social media websites by using tools such as web crawlers, downloaders, and RSS readers. The collected content is manipulated or transformed in order fit into predefined data schemes that have been developed to provide businesses with specific BI metrics. The content may be related to sales, production, operations, finance, etc. After collection and manipulation, the collected content is stored in a data warehouse or a data mart. The content is then transformed by applying information extraction techniques in order to provide the BI metrics to users. For example, an organization may utilize a BI application to obtain financial data in order to present a two-dimensional graph illustrating the stock prices of a particular organization "X" or a simple sentiment analysis providing the sentiment, i.e., positive or negative, expressed in the content. This output may then be interpreted by the organization to identify cues from the presented content and use them for business performance management. For example, an organization may provide the stock pricing graph to the public in order to inform users interested in investing with information related to the organization's earnings and securities performance.

BI applications use Key Performance Indicators (KPIs), sometimes referred to as Key Performance Metrics (KPMs), to assess the current state of a business. For example, in an organization, inventory turnover is a KPI for managing inventory. Nowadays, organizations that face higher operational risks, such as credit card companies and financial management service providers, often make KPI-related data available on a weekly basis. In some cases, organizations may provide a daily analysis of the data for time-efficient decision making. Various information extracting techniques such as enterprise decision management, marketing analytics, predictive science, strategy science, credit risk analysis, and fraud analytics are applied on the KPIs. Conventionally, KPIs and the underlying information extracting techniques are applied on the data that is already parameterized and maintained in a structured format. However, there does not exist any equivalent information extraction technique that can be employed for various other types of data, such as unstructured data. Unstructured data includes information that either does not have a data structure or has one that is not easily usable by a computer program. Examples of unstructured data include, but are not limited to, text files such as Microsoft® Word documents, Portable Document Format (PDF) files, and e-mail records; image files such as Joint Photographers Experts Group (JPEG) files, Tagged Image File Format (TIFF) files, and Graphics Interchange Format (GIF) files; audio files such as MP3 and Windows Media files; and video files such as Waveform Audio (WAV) format files and Moving Pictures Experts Group (MPEG4) files.

Current BI applications are incapable of utilizing unstructured data for a variety of reasons. Current BI applications are designed or architected to provide specific analytics and thus expect a specific data schema or arrangement. Thus, current BI applications are not able to utilize the various metadata, either explicit or inherent provided by unstructured data. For example, unstructured data fails to provide any explicit data structure and instead provides dimensions or identification attributes, such as tags or metadata that may describe the unstructured data. In the rare case that unstructured data has some explicit structure, it may not be compatible with any of the designed, or turnkey BI applications. In addition, unstructured data may not provide a schema or other data descriptor that may be interpreted by current BI systems. Thus, current BI applications will fail to extract any base data on which analytics may be run. Finally, unstructured data often is in variable formats and structure, even within the same service area, market, type and content. Thus, implementers of current BI systems are unable to make assumptions about data and attempts to automate the use of current BI systems on various unstructured data sources have failed.

Currently, a few methods exist which attempt to bring unstructured data into existing BI applications Methods such as manual tagging and automated extraction attempt to address the problem of using unstructured data for BI applications, but such methods also have one or more disadvantages.

Manually tagging the unstructured data to provide a well-defined structure is disadvantageous for the following reasons. First, market research reveals that unstructured data accounted for 6 petabytes of capacity in 2008 and is expected to grow at an annual rate of 54% to 28.5 petabytes by 2010, leading to difficulty in coping with such a myriad of unstructured data. Second, a manual process may produce more errors as compared with an automated method of tagging. Thus, manual tagging fails to scale as the amount of unstructured data grows and may introduce a significant number of errors into the data.

Various automated information extracting techniques such as semantic web, Latent Semantic Analysis (LSA), Support Vector Machines (SVM), and search engines have been used in an attempt to provide data to BI applications. These techniques may assess content (structured and unstructured) and extract KPIs. However, these techniques also have various drawbacks.

The semantic web technology relies on publishing content in specific languages, for example, Resource Description Framework (RDF), Web Ontology Languages (OWL), and Extensible Markup Language (XML). Specifically, the Semantic Web technology relies on RDF, which is based on setting RDF links between data items from different data sources but with same properties such as structure and size. Thus, there is an exponential growth in the data structure based on the link connectivity. Further, there is a limitation on the number of links that can be provided in the documents. Additionally, the semantic web technology performs unsatisfactorily for imprecise concepts present in user queries. For example, concepts such as "young" and "tall" are vague and cannot be understood without performing linguistic processing. For precise concepts, there exists an uncertainty, for example, a patient might report a set of symptoms, which may correspond to a number of distinct diagnoses.

Further, in semantic web technology, various hierarchical ontologies are formed to classify data. Subsequently, ontologies from different sources are combined to form a complex ontology. There exist logical contradictions while combining ontologies from separate sources. These logical contradictions lead to inconsistencies that cannot be resolved without context- or domain-specific approaches. Moreover, these hierarchical ontologies are built from innumerable root nodes or class names with semantically duplicate terms. The semantic web technology cannot eliminate the duplicate terms present in the ontologies. Thus, while classifying the content in these ontologies, the semantic web system has to deal with large volumes of data and due to which causes processing speed to reduce considerably.

Another information extracting technique is LSA, which is a Natural Language Processing (NLP) technique that is used for tagging data to provide a structure to unstructured data. The technique uses a term-document matrix that provides the frequency of occurrence of a term in a document. However, using the LSA technique for tagging the unstructured data is disadvantageous in a number of ways. First, the LSA technique cannot capture the multiple meanings of a word or a phrase (i.e., polysemy). Additionally, the technique cannot differentiate between sentences that have same grammatical structure but different interpretations. For example, "We gave the monkeys the bananas because they were hungry" versus "We gave the monkeys the bananas because they were overripe," where the pronoun "they" refers to monkeys in the first sentence and bananas in the second sentence. Using the LSA technique, a string of words may be interpreted in different ways; therefore, the appropriate context of the string of words cannot be determined accurately. For example, the string "Time flies like an arrow" may be interpreted in a variety of ways, one interpretation can be as the common simile, "Time moves quickly just like an arrow does." Alternatively, the phrase could be interpreted as measure the speed of flying insects like you would measure that of an arrow (thus interpreted as an imperative), i.e., (You should) time flies as you would (time) an arrow.

Additionally, SVM is a Machine Learning (ML) technique that classifies the content in taxonomies using a set of supervised learning techniques. The taxonomies are updated automatically after predefined intervals. The major drawback of the technique is that there are a set of rules that are used only during the classification phase. However, no rules for language are applied for differentiating sentences with same grammatical structure but have different interpretations and to identify multiple meanings of a word or a phrase (i.e., polysemy).

Most information extracting techniques rely on text search and search engines to index the data for text mining. Typically, text mining techniques facilitate the structuring of input data and deriving patterns from structured data, and a final evaluation and interpretation of the output. There are various drawbacks related to using search engines in text mining, such as search-related text mining identifies results on the basis of exact keyword and pattern matches; therefore, the results that are imprecise or inferential are not identified. Further, there is no semantic analysis performed during the search, thus the context of the query is not well interpreted and understood by the system that is used for applying the information extracting techniques.

Information extracting techniques as described above are based on classifying content in pre-defined hierarchical ontologies that are stored in a database. These pre-defined ontologies are generally domain specific and not specific to the context of a user's query. Thus, classifying content in the pre-defined ontologies produces irrelevant results for the user's query.

While there are computational tools that perform sentiment analysis or opinion mining using NLP techniques, these tools simply grade the content as positive or negative and are insufficient in assessing the impact of the content. For example, a news item related to a particular brand may be graded as positive or negative based on a user's preference. However, the tool cannot assess the impact of the news item on the reputation of the brand. Also, these tools can only process one analytic at a time corresponding to the content that is collected. For example, the tool may only provide sentiment analysis and may not perform assessment to provide other analytics such as risk scores analysis, portfolio analysis, etc., on the same content. Thus, a user has to rely on various computational tools, techniques, and research analysts recommendations to process and receive the desired information from the content.

Various computational tools, such as IBM Intelligent Miner, are used to categorize a set of extracted documents in predefined categories. However, one of the major disadvantages of the IBM Intelligent Miner is that the documents are categorized in fixed categories and no further categorization or refinements to next level categories such as organization-based and/or context-based categories is not possible. Further, the categories are generally first-level categories, which are not useable in providing numerous analytics that require multiple-level hierarchical classes or taxonomy. Also, different analytics cannot be applied on the categorized data as it requires precise concepts (that are derived after high-level classification) and ability of a system to apply various data/text mining techniques on different data sources.

Extract, Transform, and Load (ETL) process, which involves extracting data and automatically (through machine learning process) building a new structured database from the intake of the data has been utilized to load data into structured databases. Descriptions of various embodiments of the ETL process can be found, for example, in Patent Applications US 2007/0011134 A1, titled "System And Method Of Making Unstructured Data Available To Structured Data Analysis Tools" and US 2005/0108256 A1, titled "Visualization Of Integrated Structured And Unstructured Data," U.S. Pat. No. 7,409,393 B2, titled "Data Gathering And Distribution System" and U.S. Pat. No. 6,694,307 B2 titled "System For Collecting Specific Information From Several Sources Of Unstructured Digitized Data." The result of the ETL process is a structured database that includes the extracted unstructured data in a known format. However, the patents/applications mentioned above and other ETL publications and applications fail to disclose automatically applying analytics on the data that require various manipulations and modification of data during the data processing stage.

Additionally, all of the aforementioned information extracting techniques require textual or ASCII-based source content. However, with advent of high-speed wired and wireless networks it is evident that the enormous amount of non-text data such as image, video, and audio is being generated in the variety of business and personal transactions performed day-to-day. Thus, the current information extraction techniques are unable to utilize the various non-text data fail to extract and utilize the large amount potentially relevant data in their generation of KPIs.

Existing information extracting techniques described above have a number of drawbacks including the inability to obtain data from text and non-text data sources, requiring a pre-defined, pre-architected data scheme, lack of scalability, lack of flexibility and a critical emphasis on the use of structured data. Therefore, in light of the foregoing discussion, there is a need for a method and system for BI analytics that can utilize textual and non-text data that is structured or unstructured, is scalable, efficient, flexible and malleable in its ability to provide key BI metrics as they develop in the marketplace.

SUMMARY OF THE INVENTION

In general terms, the present invention is a method for the capture, classification and dimensioning of data from text-based and non-text data sources that may include structured and/or unstructured data.

One embodiment utilizes a machine-implemented method for a pipelined process of capture, classification and dimensioning of data from a plurality of data sources that may include unstructured data having no explicit dimensions associated with the unstructured data to generate a domain-relevant classified data index that is useable by a plurality of different intelligence metrics to perform different kinds of business intelligence analytics. In various embodiments a data processing machine, such as a computer system having one or more processors, is utilized to collect ingested data as one or more documents from each of the plurality of data sources that include structured and/or unstructured data and automatically generate and store an ingested data index. The ingested data index may store data representing the ingested data that includes at least a hyperlink and extracted information including at least one of metadata or data for each document. A data processing machine may automatically classify each of the one or more documents into one or more relevance classifications that are stored with the ingested data index for that document. Thus, the relevance classifications may form a domain-relevant classified data index representing the ingested data, wherein the one or more relevance classifications are based on a plurality of dynamically generated topics that are generated in response to machine analysis and in response to user input that includes user-defined named entities and user-defined keywords. In various embodiments the machine analysis includes machine-defined classifiers.

A data processing machine may automatically process the plurality of data sources with a plurality of different intelligence metric modules independent of and after the one or documents have been initially ingested and classified utilizing the domain-relevant classified data index. Further, the domain-relevant classified data index may be used to generate analytics results that are presented for a user. Generating the analytic results may include processing at least one of the documents in the ingested data with each intelligence metric module, based upon a plurality of dimensions abstracted from the relevance classifications and the extracted information that includes at least one implicit dimension derived from one or more of the user-defined named-entities or from the extracted information. In a variety of embodiments, the intelligence metric modules do not modify the ingested data index. Further, the dynamically generated topics upon which the relevance classifications are based are not determined prior to using the data processing machine to collect ingested data based upon analytic requirements of the intelligence metric modules. Thus, in various embodiments, the relevance classifications are separated in the pipelined process from the analytic requirements of any given intelligence metric module.

Other embodiments obtain user-feedback from the user in response to the analytic results that are presented for the user and cause a data processing machine to adaptively utilize the user-feedback to modify the relevance classifications. Another embodiment, data from data sources including text, images, video and audio is captured, classified and dimensioned. Further, in various embodiments utilizing a data processing machine to collect ingested data includes using data source connectors to access the plurality of data sources wherein the data source connectors include one or more of internal file system connectors, web site connectors, blog connectors, subscription connectors, email connectors, short-message-service connectors. In other embodiments using a data processing machine to collect ingested data may include using multi-modal scanning to identify and access the plurality of data sources. Still other embodiments may utilize a data processing machine to collect ingested data using automated information extraction techniques to generate at least some of the extracted metadata for each document, wherein different automated information extraction techniques are used for different types of documents.

The different information extraction techniques may include video information extraction for video document types based on events, objects, activities or motion, image information extraction for image document types based on events, objects or activities, audio information extraction for audio type documents based on text translation or phonetics, text information extraction based on natural language processing pattern matching, statistical processing or related techniques, or any combination thereof for documents of single or multiple types.

In various embodiments a data processing machine is utilized to automatically classify each of the one or more documents into one or more relevance classifications using multimodal indexing for at least some of the documents to generate index information that is stored with the ingested data index for that document to form the domain-relevant classified data index representing the ingested data.

Further, various embodiments utilize a data processing machine to automatically process the ingested data with the plurality of different intelligence metric modules using different data processing machines to perform different ones of the plurality of different intelligence metric modules. In other embodiments the process utilize a data processing machine to automatically process the ingested data with the plurality of different intelligence metric modules including reprocessing one or more documents with at least one of the intelligence metric modules.

Various embodiments may utilize a data processing machine to automatically process the ingested data with the plurality of different intelligence metric modules and generate key performance indicator analytic data associated with the domain-relevant classified data index that differs for different types of documents including: video analytics for video document types based on events, objects, activities or motion, image analytics for image document types based on events, objects or activities, audio analytics for audio type documents based on text translation, phonetics or emotion extraction, text information extraction based on natural language processing, statistical processing, or event detection or, or any combination thereof for documents of single or multiple types. In a related embodiment the plurality of different intelligence metric modules process the ingested data including the key performance indicator analytic data to generate a series of key performance indicator tables stored in a structured query language database.

In still other embodiments, the plurality of different intelligence metric modules include both intelligence metric modules that are developed by one or more non-users and customized intelligence metric modules that are defined by the user.

In one embodiment using a data processing machine to automatically process the ingested data with the plurality of different intelligence metric modules to generate analytics results that are presented for a user may include providing a query user interface accessible using the data processing machine and providing a display user interface accessible using the data processing machine. Providing the query user interface accessible using the data processing machine may include providing a structured query user interface and an ad hoc query user interface. Further, obtaining user-feedback from the user in response to the analytic results that are presented for the user query user interface may be accomplished using the query user interface. In addition, providing the display user interface accessible using the data processing machine may include a non-text display, a report display, an alerts display, a dashboard display, or any combination thereof.

In one embodiment, the plurality of different intelligence metric modules may be selected from one or more of: a preconfigured set of intelligence metric modules, a user-identified set of intelligence metric modules, a user-selected subset of a machine-recommended set of intelligence metric modules, or a machine-selected set of intelligence metric modules.

BRIEF DESCRIPTION OF THE DRAWINGS

The accompanying figures, where like reference numerals refer to identical or functionally similar elements throughout the separate views, and which, together with the detailed description below, are incorporated in and form a part of the specification, serve to further illustrate various embodiments and explain various principles and advantages, all in accordance with the present invention.

DETAILED DESCRIPTION OF THE INVENTION

Various embodiments of the present invention provide a pipelined architecture to employ business intelligence metrics on ingested data that may include structured and/or unstructured data captured or collected from various data sources, which is then dimensioned or indexed to create implicit dimensions using adaptive classification system, and then analytics are applied on the data to create business intelligence metrics. Various embodiments of adaptive data classification that may be used with the various embodiments of the present invention are disclosed in the U.S. patent application Ser. No. 12/105,598 to Guha, et al. titled, 'Adaptive Archive Data Management', filed on Apr. 18, 2008, and U.S. patent application Ser. No. 12/331,363 assigned to Guha, et al. titled, 'Adaptive Data Classification For Data Mining', filed on Dec. 9, 2008, the disclosures of which have been incorporated by reference in their entirety.

Figure 1:
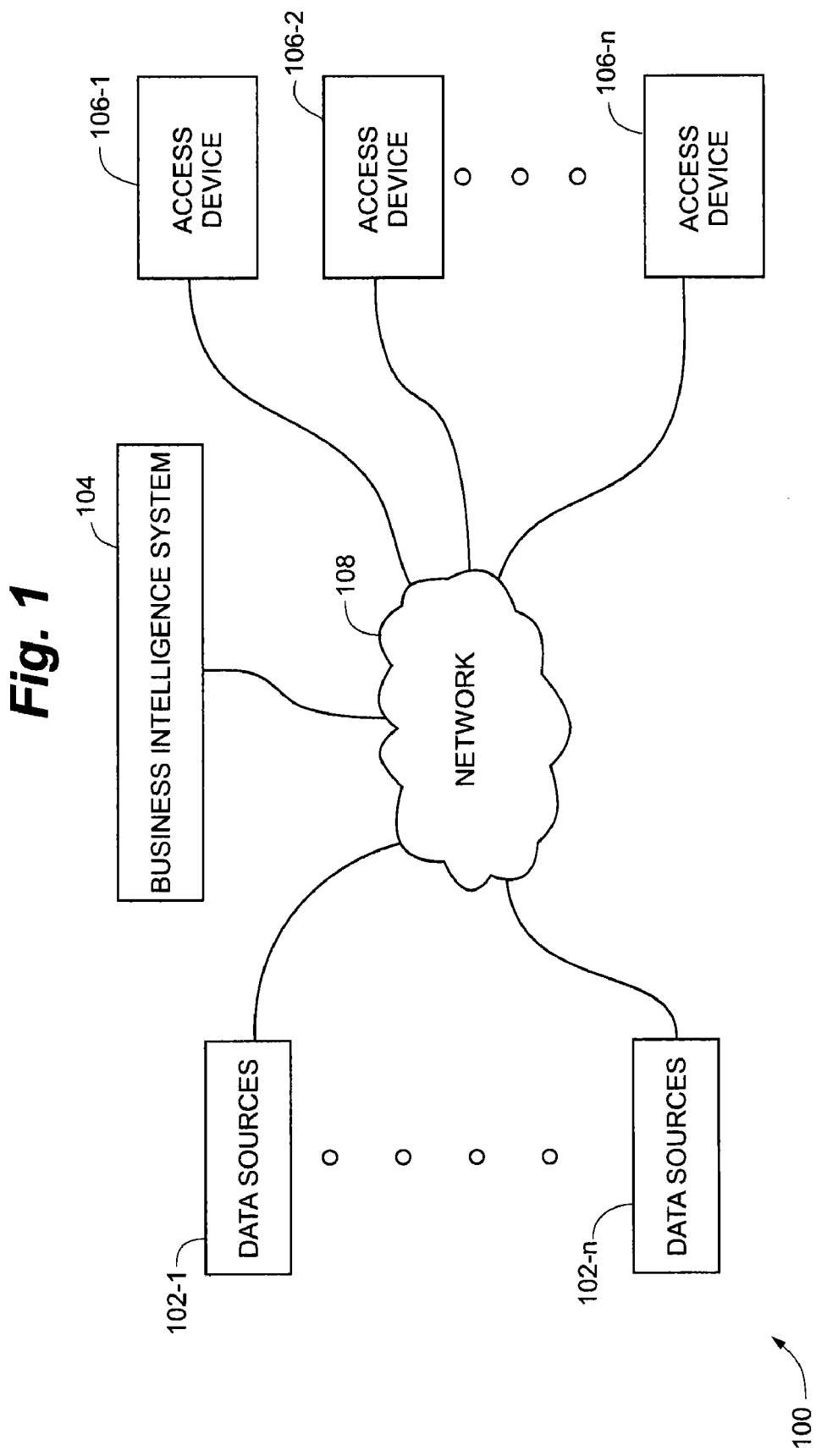
FIG. 1 depicts an environment in which various embodiments of the present invention can be practiced.

FIG. 1 depicts an environment 100 in which various embodiments of the present invention can be practiced. Environment 100 includes a plurality of data sources 102-1 to 102-n (hereinafter referred as data sources 102), a Business Intelligence (BI) system 104, one or more access devices 106-1 to 106-n (hereinafter referred as access devices 106), and a network 108.

Data sources 102 are sources of structured and/or unstructured data. Examples of data sources 102 include, but are not limited to, content providers that supply information over a network, such as Yahoo® Finance, Google™, company websites, Twitter™, YouTube™, phone call recordings, and blogs. In other embodiments, the unstructured data may be provided my network attached end-user computers, web servers, database servers or other network attached computing devices. Unstructured data can be text or non-text, without a format or explicit dimensions or a data structure usable by a computer program. For example, unstructured data in the text form can be files, websites, emails, blogs, reports, etc., and unstructured data in the non-text form can be audio, video, images, etc. In one embodiment, data sources 102 are provided to a user through a user interface, from which the user selects the appropriate data sources 102 for extracting pertinent data.

Figure 6:
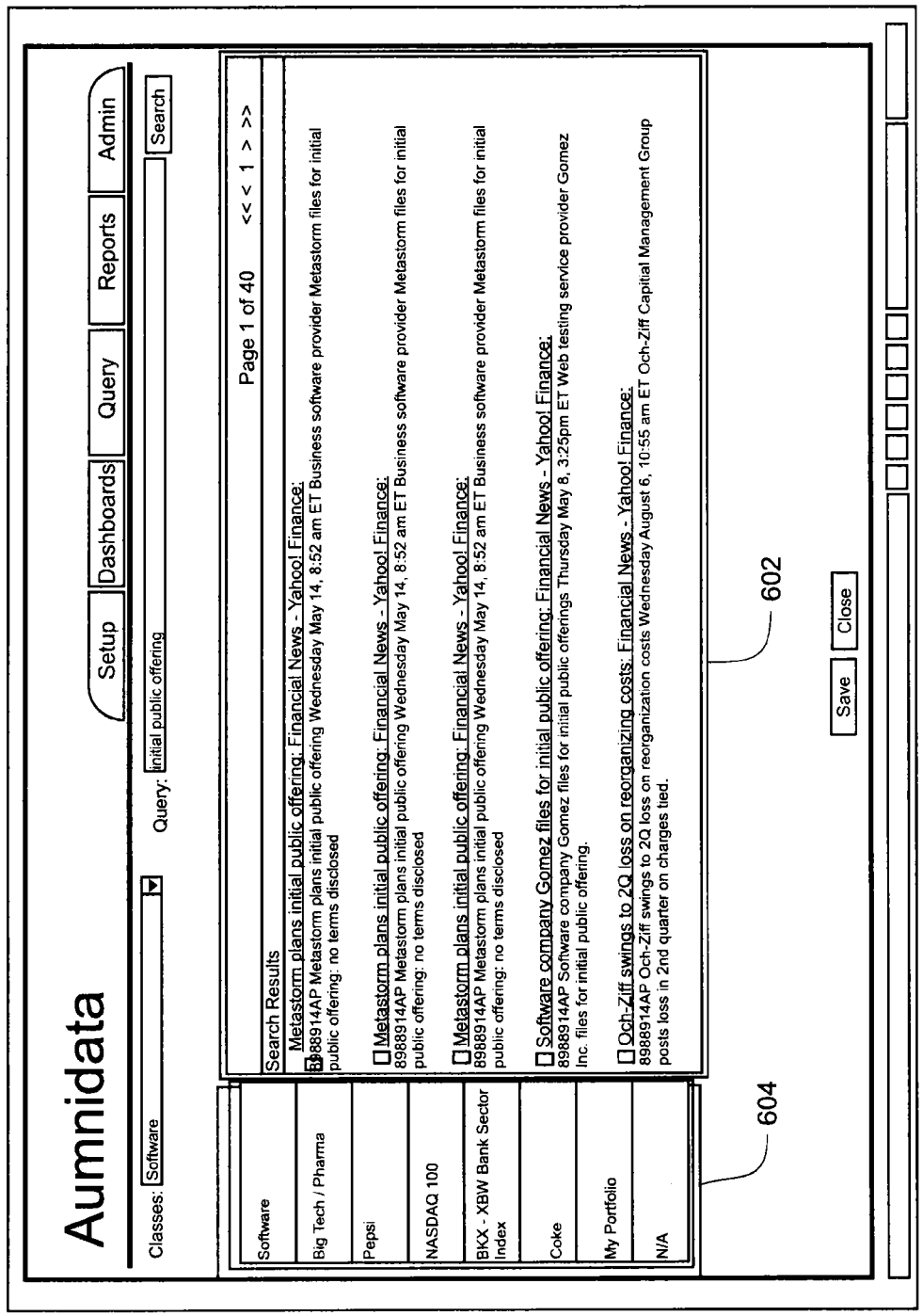
FIG. 6 is a screenshot illustrating an ad-hoc query interface, displaying search results for a user's input query, in accordance with an embodiment of the present invention.

Business Intelligence (BI) system 104 is a computational system that aggregates or ingests the pertinent data from data sources 102, and performs various information extracting techniques, such as statistical modeling, linguistic processing, pattern matching, machine learning, trend analysis, and logical queries on the data (the information extracting techniques are explained in detail in conjunction with FIG. 6). These information extracting techniques may be used to extract keywords/phrases from the aggregated data. Further, the extracted keywords/phrases may indicate Key Performance Indicators (KPI) that assess the current state of a business. Once, the information extracting techniques are applied, BI system 104 executes analytics, such as risk scores analysis, portfolio analysis, and stores the resulting BI metrics, making the results available to the user through various interfaces, or available to subsequent applications as input. In various embodiments BI Metrics are used to assess the impact of the collected data and is used for better business decision making.

Access devices 106 are digital devices that include a Graphical User Interface (GUI) and are capable of communicating with the BI system 104 over a network 108. Examples of access devices 106 include mobile phones, laptops, Personal Digital Assistants (PDAs), pagers, Programmable Logic Controllers (PLCs), wired phone devices, and the like. Examples of network 108 include, but are not limited to, Local Area Network (LAN), Wide Area Network (WAN), satellite network, wireless network, wired network, mobile network, and other similar networks. Access devices 106 are operated by users to communicate with BI system 104. In various embodiments, dashboards and reports may be automatically generated to display the result of the BI metrics on a screen of access devices 106.

In accordance with an embodiment of the present invention, the user's access devices 106 to send a query and receive a result. The user may input a structured query through a structured query interface. Alternatively, the results may be automatically generated and displayed on the screen of access devices 106 through dashboards. The result may be, for example, in the form of a two-dimensional graph illustrating risk score analyses of a set of organizations, reputation of a particular brand, etc. Access devices 106 communicate with BI system 104 through a client application such as a web browser, a desktop application configured to communicate with BI system 104, and the like.

Figure 2:
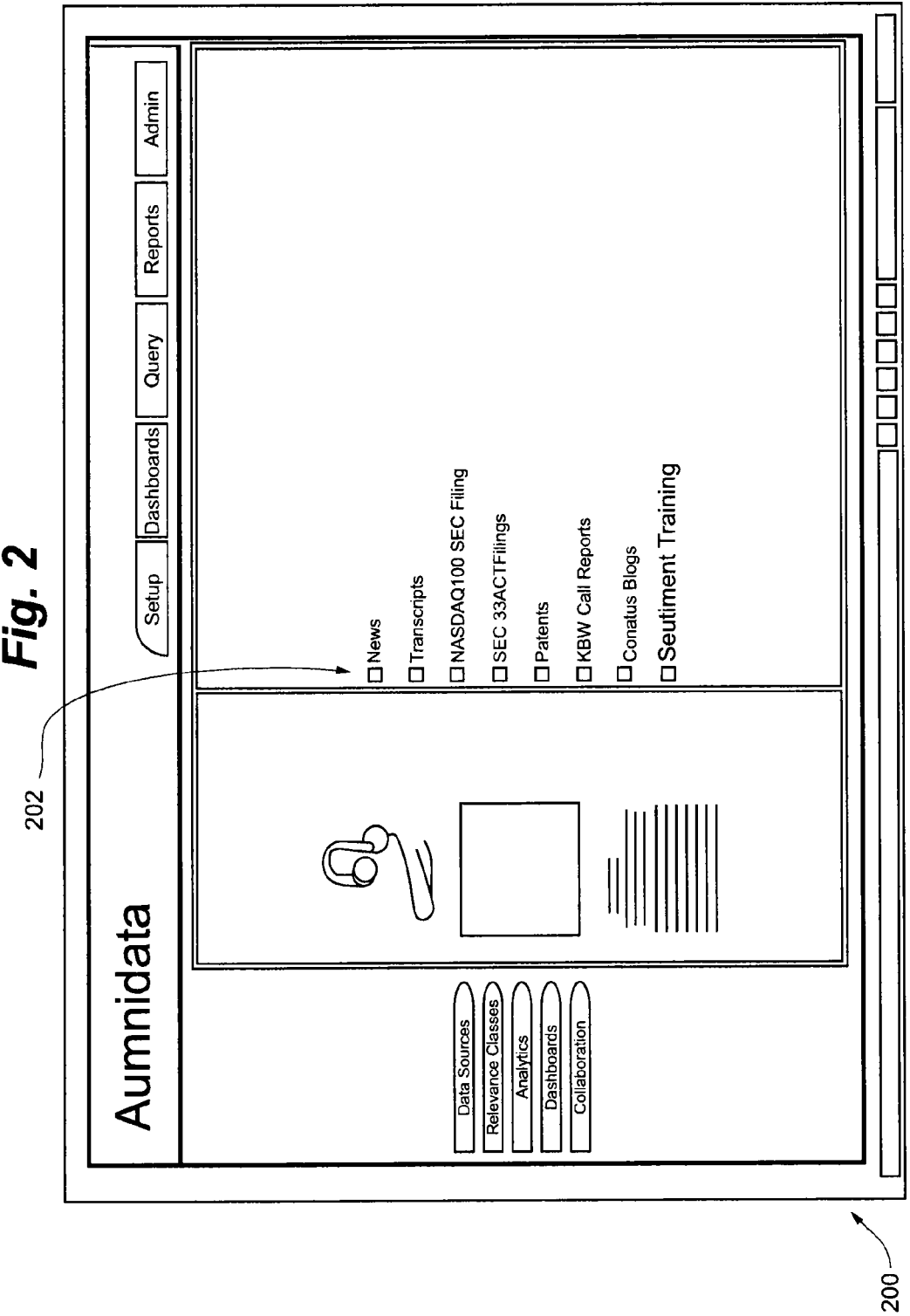
FIG. 2 is a screenshot illustrating an interface, displaying data sources provided to a user, in accordance with an embodiment of the present invention.

FIG. 2 is a screenshot illustrating a user interface 200 displaying data sources 202 provided to a user, in accordance with an embodiment of the present invention. The user is presented an interface 200 for selecting data sources 202 from where information can be retrieved or downloaded. Additional examples of data sources 202 include, but are not limited to, news items related to publically trading organizations, transcripts of a conference call held at a publically traded organization, National Association of Securities Dealers Automated Quotation System (NASDAQ) Securities Exchange Commission (SEC) filings, SEC 33 ACT filings, patents, bank call reports filed with the Federal Deposit Insurance Corporation (FDIC), and blogs. Data sources 202 are provided either through internal or private sources of an organization, such as internal reports, presentations, and recorded phone calls, etc. Alternatively, data sources 202 are provided through external sources such as various content providers that make data publically available on Internet in the form of news, transcripts, patents, etc.

Figure 3:
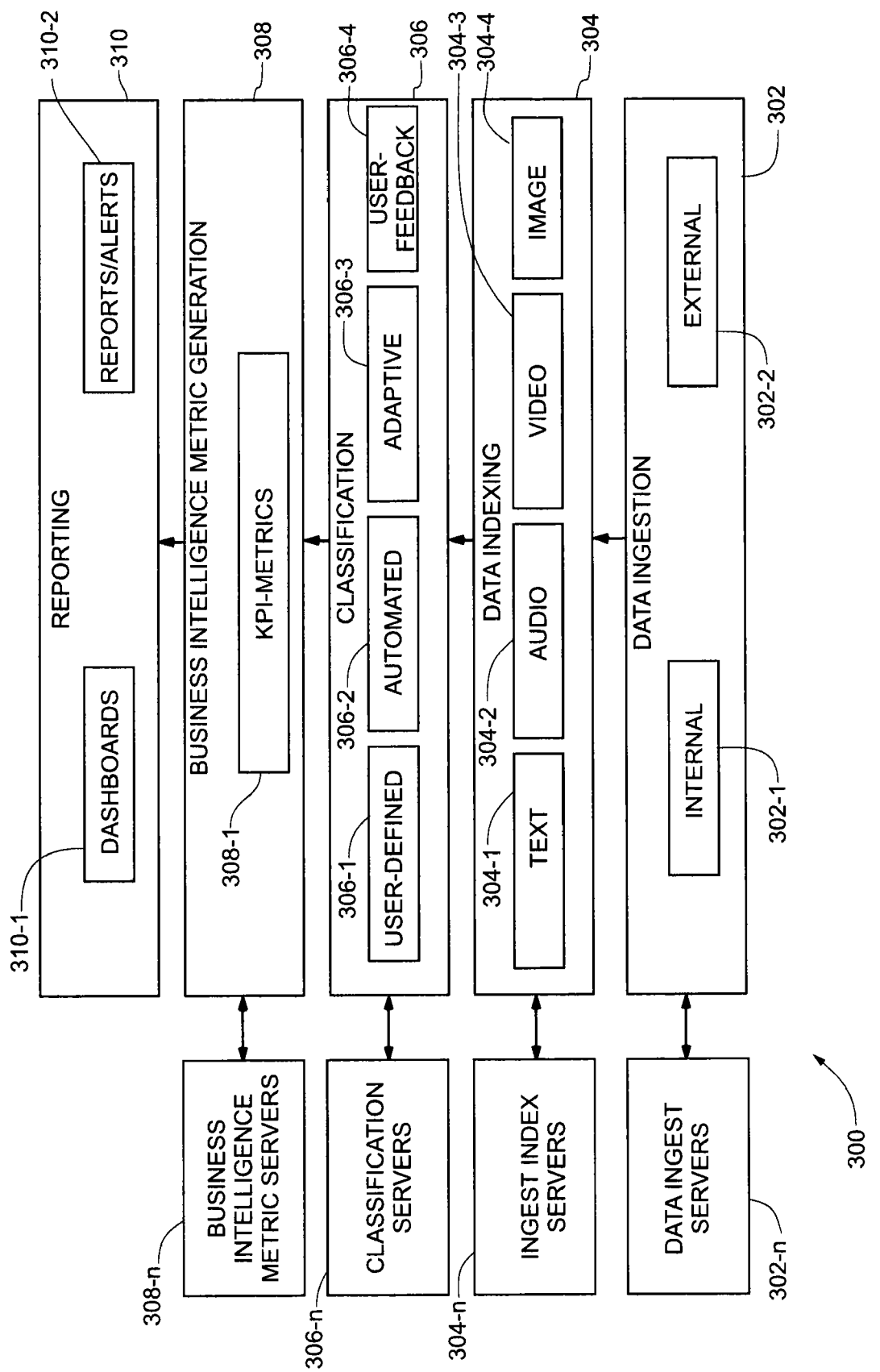
FIG. 3 illustrates an exemplary setup for a business intelligence system, in accordance with an embodiment of the present invention.

FIG. 3 illustrates an exemplary setup of BI system 300, in accordance with various embodiment of the present invention. BI system 300 may include a machine-implemented pipelined process including a data ingestion (or aggregation) 302 portion, a data indexing (or dimensioning) 304 portion, a classification 306 portion, a business intelligence metric generation 308 portion, and a reporting 310 portion.

In various embodiments, the data ingestion 302 portion is performed utilizing numerous internal 302-1 and external 302-2 data sources using one or more data ingestion tools such as data source connectors, downloaders, Rally Simple Syndication (RSS) readers, multi-modal scanners, and others. For purpose of the present invention, it will be understood that ingested data is meant to include data ingested from internal 302-1 and external 302-2 sources, data ingested from sources of structured data, data that has been ingested by a third-party and data that has been both ingested and classified by a third party. In this way, the system and method are able to ingest data from a variety of sources and in a variety of forms without costly, error-prone and time consuming data transformations.

In various embodiments, an ingestion tool such as a data source connector is a software program that captures, and stores data from one or more data sources available either internally or externally. The connector may connect to internal data sources 302-1 and external 302-2 data sources to retrieve unstructured data. The unstructured data may be in the form of files, streamed data or other forms of data readily available over a network connection. Further, a specific connector is created for each specific data type and data source such that metadata as well as the data or full-content in the unstructured data file can be extracted. Examples of metadata include, but are not limited to, date of creation of the file, source of publication of the unstructured data file, type of unstructured data file (text or non-text), subject of the unstructured data file, and organization's name.

The data source connector can connect to different unstructured data sources or a website's Uniform Resource Locator (URL) to aggregate data for a predefined time interval. For example, a connector can connect with a public website such as United States Patent and Trademark Office (USPTO) website to retrieve all issued patent information for a particular inventor, assignee date range, etc. The connector provides a name of the inventor, the assignee, or the date range to the USPTO website and extracts URLs corresponding to each issued patent. Subsequently, the connector follows the URLs of each patent to retrieve the patent files to obtain information corresponding to each of the issued patents.

In various embodiments, data source connectors include one or more internal file system connectors, web site connectors, blog connectors, subscription connectors, email connectors, Short Message Service (SMS) connectors, Multimedia Messaging Service (MMS) connectors, etc.

A downloader is a software program capable of downloading web pages, images, movies, spreadsheets, presentations, ISO files and other data from one or more websites or other data provider over a network. Thus, a downloader is capable of downloading nearly any file from a network attached system in an effort to obtain relevant data.

In various embodiments, the data aggregated utilizing the various aggregation tools described above, is stored for further analysis and processing. The ingested data may be stored in data ingest servers 302*n* to enable efficient storage and retrieval of ingest data.

The ingested data is indexed and stored in an ingest index, by performing data indexing 304 on the multi-modal data aggregated from internal 302-1 and external 302-2 data sources. Data indexing 304 is performed by using automated information extraction techniques to generate indexes of at least some of the extracted metadata for each document type of the data aggregated from internal 302-1 and external 302-2 data sources. Further, different automated information extraction techniques are used for different types of data. For example, the aggregated data may require text 304-1, audio 304-2, video 304-3, and image 304-4 based techniques to extract information. Further, various embodiments are capable of processing text and non-text data types, therefore, data indexing 304 varies with the different data types and generates domain-relevant classified data indexes. In one embodiment, for text-based data, a word location text technique 304-1 is used to create an index of words based on the location of the word within text data. In a related embodiment a text search engine is used for extracting and indexing the text-based data. In another embodiment, a speech-to-text audio extraction technique 304-2 that relies on continuous speech transcription or phonetic transcription is utilized to index audio data.

In accordance with an embodiment of the present invention, another text technique 304-1, Natural Language Processing (NLP), may used for indexing the data. These NLP techniques are applied by parsing data that is aggregated from internal 302-1 and external 302-2 data sources. Subsequently, a set of keywords and phrases are extracted for classifying the data in various relevance classes.

In various embodiments, for image and video data, the data index is based on presence of specified features or data such as presence or detection or movement of specific objects. These features or data may be extracted utilizing various video and image information extraction techniques based on existing or established video and image feature recognition and detection tools.

In various embodiments, the indexed ingest data is stored in an ingest index data server 304-n. In other embodiments, the indexed ingest data is stored in the data ingest servers 302-n. In this way, the BI system 300 may utilize various configurations of servers to allow for the storage and enable efficient retrieval of ingest index data upon which classification may be performed.

After indexing the ingest data, taxonomies are prepared in BI system 300 in classification servers 306-n, for classification 306 of the indexed data. In accordance with an embodiment of the present invention, various techniques may be used independently or in combination for classification of the data. Examples of data classification techniques include user-defined classification 306-1, automated classification 306-2, adaptive classification 306-3, or user-feedback based classification 306-4.

In user-defined classification 306-1, the user is presented with an interface to create an initial relevance class for the classification. User can define the initial relevance class via any combination of the following options: a) using combination of keywords; b) using specific names, i.e., named entities; c) using sample documents. Keywords are a list of words or phrases, which have been explicitly designed by the user to define the initial relevance classes. Further, user-defined classification 306-1 is a preliminary classification, which may not be correct or complete, and therefore is required to be corrected or updated at predefined intervals. For example, user-defined classification 306-1 may be updated or corrected through automated classification 306-2 or in adaptive classification 306-3. In various embodiments, adaptive classification 306-3 adaptively utilizes user-feedback received within a predefined interval and implicit feedback extracted from the result sets displayed to users to update the relevance classes. In one embodiment, the required updates may be scheduled at regular intervals of time. Alternatively, an administrator of the BI system 300 may configure the updates on an as-needed basis. In addition, in certain embodiments, the classified data is stored in a domain relevant classification database (not shown in FIG. 3), which is part of classification server 306-n.

After classification 306 of the indexed data is complete, the business intelligence metrics 308 are executed. Various information extracting techniques are applied to extract keywords and phrases from the classified data. Thereafter, post processing is applied using the set of extracted keywords and phrases. For example, lexical equivalence of linguistic concepts is identified to obtain keywords or phrases that convey similar meanings. For example, in the financial sector, the word "risk" may be considered equivalent to "Uncertainty" in revenue, or "lack of visibility" to revenue, etc.

In various embodiments, the keywords described herein are used to identify synonyms, acronyms and antonyms. These synonyms, acronyms and antonyms, which are then used to standardize the content to facilitate further processing. For example, "MSFT", "Microsoft", "Microsoft Corp", "Microsoft Corporation" may be standardized to represent "MICROSOFT". Further, there may be some instances where a phrase or a keyword is inferred. For example, "corp" may be inferred as "Corporation" or vice versa. Additionally, words in the extracted phrases or keywords can be expanded or abbreviated. Furthermore, to maintain consistency, the identified phrases or keywords may be standardized and duplicate keywords or phrases may be removed.

The set of extracted keywords and phrases are used as KPIs to generate a KPI metric 308-1. In certain embodiments, the KPI metric 308-1 is generated by a business intelligence metric server 308-n. In addition, based on the KPI metric 308-1, reporting 310 of the relevant results is performed. The results may be reported to the user on a dashboard 310-1 or in the form of reports/alerts 310-2 presented to the user via an interface on access device 106. In certain embodiments, reports/alerts 310-2 are presented to the user through a Web 2.0 interface, in other embodiments a simple text interface, SMS message or MMS message is utilized to present the reports/alerts. Additionally, the results from business intelligence metric server 308n may be stored in a database such as a Structured Query Language (SQL) database for further processing.

Figure 4:
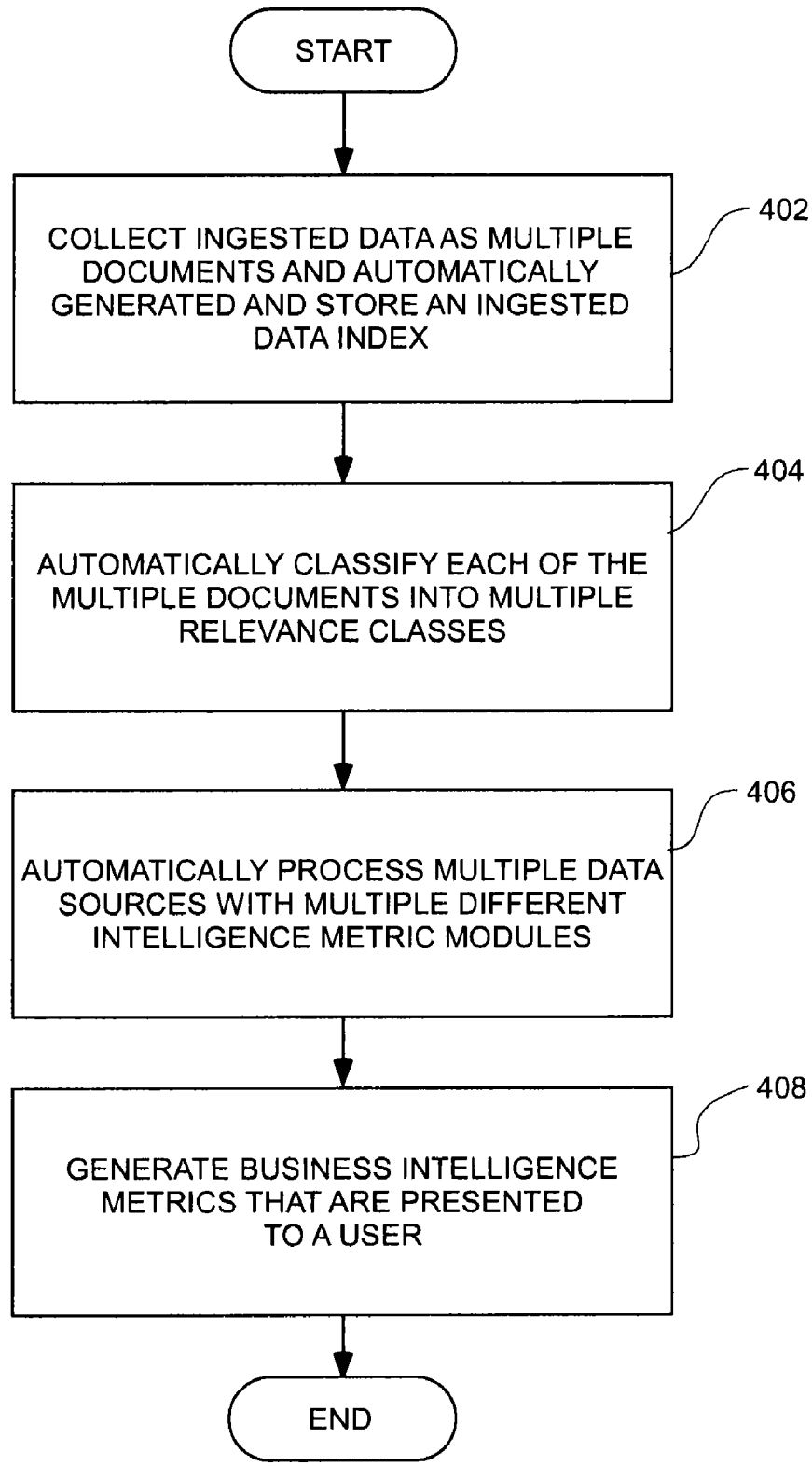
FIG. 4 is a flowchart illustrating a machine implemented method for a pipelined process of capture, classification and dimensioning of data, in accordance with an embodiment of the present invention.

FIG. 4 is a flowchart illustrating a machine-implemented method for a pipelined process of capture, classification and dimensioning of data, in accordance with an embodiment of the present invention. At step 402, a data processing machine may collect ingested data in the form of multiple documents from a data source 102. The data source 102 may be identified and accessed using multi-modal scanning performed periodically over the network. The documents may include unstructured data in the form of text and/or non-text data. The collected ingested data is used to index and automatically generate an ingested data index representing the ingested data. In various embodiments, the ingested data index includes hyperlink and extracted metadata for each of the multiple documents. Examples of metadata include, but are not limited to, date of creation of the file, source of publication of the unstructured data file, type of unstructured data file (text or non-text), subject of the unstructured data file, and organization's name.

At step 404, the data processing machine automatically classifies each of the multiple documents into relevance classes. The relevance classes are stored with the ingested data index for that document to form a domain-relevant classified data index representing the ingested data. The relevance classes are based on dynamically generated topics that are generated in response to machine analysis that includes machine-defined classifiers and in response to user input that includes user-defined named-entities and user-defined keywords. For example, a user inputs a query that relates to "Latest features in new handsets of organization IX'"; for such a query relevance classes will be created based on a) machine-defined classifiers, for example, handset companies, wireless devices, mobile phones, mobile phone features, and b) user-defined named entities, for example, Organization 'X', voice quality, etc.

At step 406, data processing machine automatically processes data sources 102 with multiple different intelligence metric modules. Data sources 102 are processed after the multiple documents have been initially ingested and classified by utilizing the domain-relevant classified data index to generate analytics results (i.e., BI metrics) that are presented to the user at step 408. Before presenting the results to a user, the documents in the ingested data are processed with the intelligence metric modules based upon multiple dimensions abstracted from the relevance classes and the extracted metadata that includes at least one implicit dimension derived from multiple user-defined named-entities. Further, the different intelligence metric modules that are used to process data sources are selected from one of a preconfigured set of intelligence metric modules, a user-identified set of intelligence metric modules, a user-selected subset of a machine-recommended set of intelligence metric modules, or a machine-selected set of intelligence metric modules.

In various embodiments, the intelligence metric modules do not modify the ingested data index. Further, the dynamically generated topics upon which the relevance classifications are based, may not be determined prior to using the data processing machine. Further, in accordance with another embodiment of the present invention, topics may be generated automatically before data ingestion using various machine learning methods. The data processing machine collects the ingested data, in one example, based upon analytic requirements of the intelligence metric modules such that the relevance classes are separated in the pipelined method from analytic requirements of a provided intelligence metric module. Alternatively, the ingested data can be collected automatically after predetermined time interval for processing and generating BI metrics.

In accordance with an embodiment of the present invention, the data processing machine is a part of the BI system 104.

Figure 5:
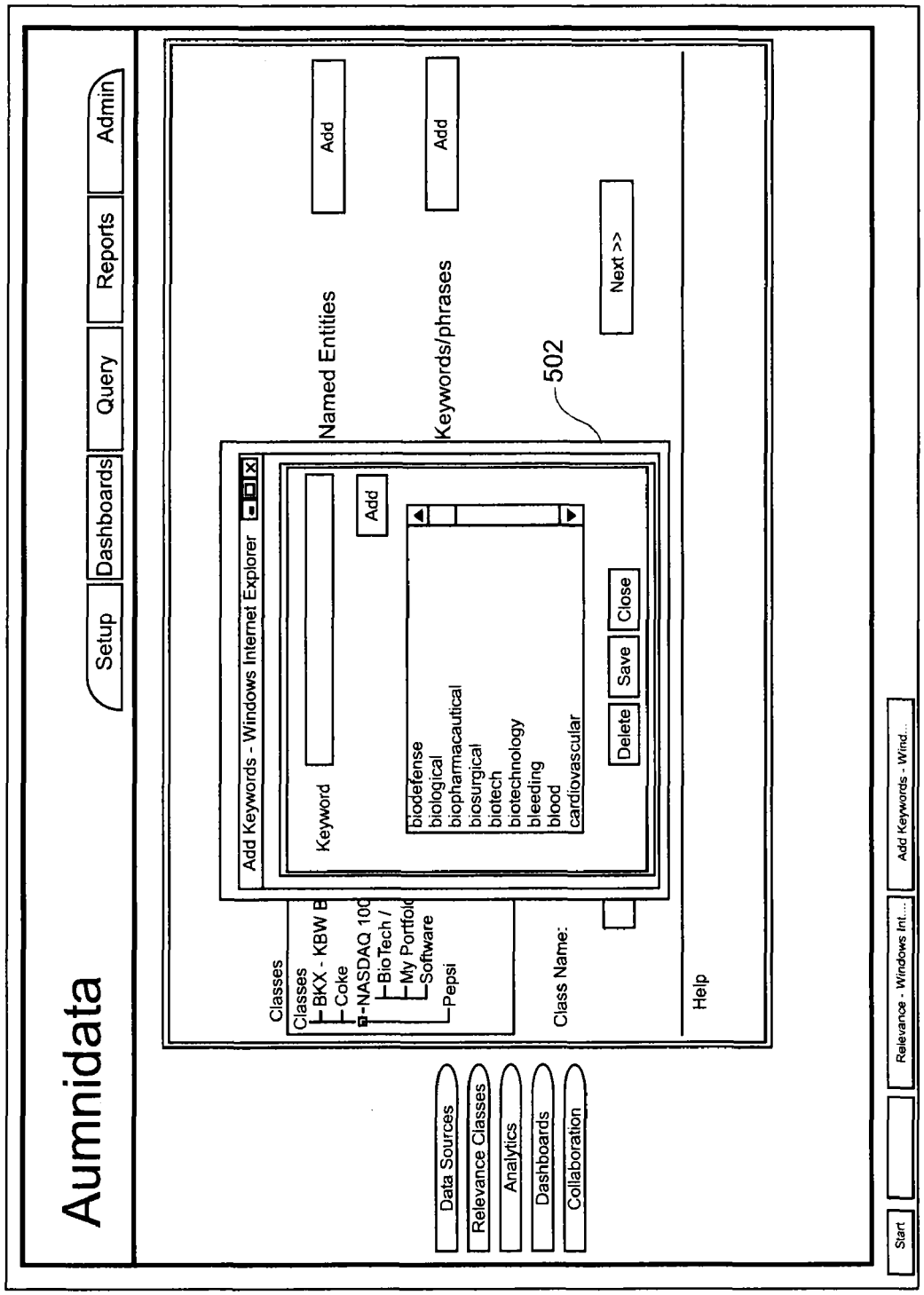
FIG. 5 is a screenshot illustrating an interface, displaying relevance classes defined by a user, in accordance with various embodiments of the present invention.

FIG. 5 is a screenshot illustrating a user interface 500 displaying initial relevance classes, as defined by a user, and interface elements allowing users to add, delete or modify relevance classes, in accordance with various embodiments of the present invention. In various embodiments, user interface 500 includes an add-keyword window 502.

As explained above in conjunction with FIG. 3, the user defines the initial relevance classes by specifying keywords. To specify keywords, the user interface 500 is presented and through add keyword window 502, the user can add, delete, and save keywords that are used to create the initial relevance classes, thus, the user is able to modify the relevance classes through the add keyword window 502. For example, a user who wants to carry out sentiment analysis for a set of organizations in the biopharmaceutical domain can provide domain-specific keywords such as biological, biopharmaceutical, biosurgical, biotechnology, etc., to create the initial relevance class for the analysis.

FIG. 6 is a screenshot illustrating one embodiment of an ad-hoc query interface 600 displaying search results for a user's input query. Ad-hoc query interface 600 may include search result listing 602 and a relevance class listing 604.

In one embodiment, once data has been ingested and indexed, utilizing, for example, the process described in FIG. 3 above, user may review the collected data by utilizing the ad-hoc query interface 600. 600. As part of this interface, the user has the option to identify a search result as being not relevant to the input query. The user can provide feedback and categorize the search result in an appropriate relevance class from the relevance class listing 604. In accordance with an embodiment of the present invention, the user may drag and drop a relevant class from the relevance class listing 604 onto the corresponding to search result in the search result listing 602.

Figure 7:
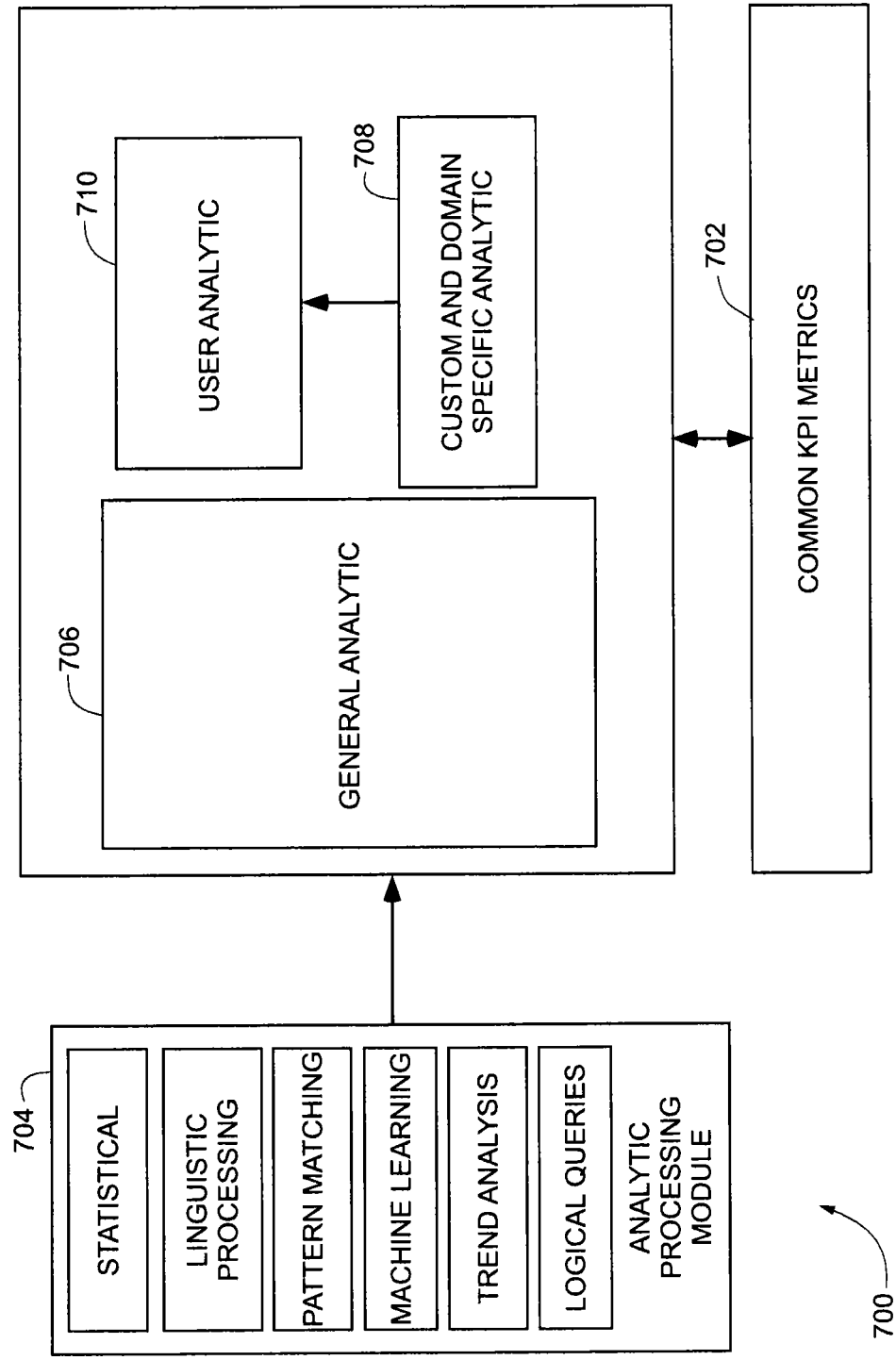
FIG. 7 is a block diagram illustrating an analytic processing system 700, in accordance with various embodiments of the present invention.

FIG. 7 is a block diagram 700 illustrating an analytic processing system 700 according to one embodiment. The block diagram includes KPI metrics 702, an analytic processing module 704, general analytics 706, custom and domain-specific analytics 708, and user analytics 710.

In one embodiment, after classifying the data utilizing the process as explained in, for example FIG. 3, common metrics are generated from the classified data that are termed KPI metrics 702. In various embodiments, KPI metrics 702 are generated based on the frequency of occurrence of indexed data representing documents that include a word or term in a relevance class. For example, for an analytic related to new brand management for a footwear brand, a metric is calculated for the frequency of occurrence of news articles and blog references that mention the footwear brand name or terms related to an associated relevance class found in data sources 102. Alternatively, in case of audio files, KPI metrics 702 is generated through a "strength of voice" rating system. "Strength of voice" is used for identifying sentiment or opinion either for a specific name within an article, or in general for a complete article. The sentiment or opinion expressed in the article or a set of cumulative articles is assessed and rated, for example, on a scale ranging from −5 to +5.

In another embodiment, KPI metrics 702 are generated through a "share of voice" rating system that indicates the number of news articles that reference a term in data sources 102 (news items) related to a competitor group for a particular relevance class. For example, for an analytic related to sentiment analysis for an organization 'X', the analytic identifies all articles in the data sources 102 that contain references to a particular named entity within a particular relevance class. Subsequently, a rating is assigned on a scale of +5 to −5, based on the analysis to show whether the reference is positive or negative.

Further, in various embodiments, analytic processing module 704 is configured to perform different information extracting techniques to extract keywords/phrases, which facilitate in generating KPI metrics 702 from data sources 102 and perform different analytics on the data. These information extracting techniques include, but are not limited to, statistical modeling, linguistic processing, pattern matching, machine learning, trend analysis, and logical queries. Further, these information extracting techniques are used for different types of documents for extracting information. For example, video information extraction for video document types based on events, objects, activities or motion, image information extraction for image document types based on events, objects or activities, audio information extraction for audio type documents based on text translation or phonetics.

In various embodiments, statistical modeling can be applied to generate KPI metrics 702. The statistical modeling may derive statistical measures from trend and momentum calculation. Trend calculation may be estimating the nature of change in KPI metrics 702. For example, trend lines in the trend calculation may illustrate change (i.e., increase or decrease) in KPI metrics 702. Further, momentum calculation may be change in the trend of any KPI metrics 702. For example, quarterly momentum of KPI metrics 702 using a "share of voice" rating system would be the change in the "share of voice" rating of an organization 'X' with respect to its competitors between two quarters.

In another embodiment, the information extracting technique, pattern-matching, forms a primary basis for many analytics. The pattern matching technique includes finding patterns corresponding to specific phrases, words or names either with or without logical queries. Also, in various embodiments, Bayesian statistics are applied after a match is identified. Bayesian statistics uses prior knowledge along with the current set of observations to identify multiple meanings of the identified match. The prior knowledge may be derived from operational or observational data. This technique is generally used to identify the occurrence of an event, for example, a new brand launch, mergers and acquisitions, etc. in the collected data.

In other embodiments Machine Learning (ML) techniques are used to determine the occurrence of an event. Typically, a set of training documents and linguistic rules are used to assign values to data. For example, a sentiment, i.e., positive or negative is assigned to a name or a word, based on the relative location of the word in a sentence. Additionally, logical queries are applied to derive full information related to the occurrence of an event. For example, in brand management analysis, after classifying data (news item) to a relevance class, logical queries are applied to derive detailed information from the data. For example, information such as "when" and "how often" (frequency of occurrence) the brand was mentioned as compared with a competitor brand may be determined utilizing various ML techniques. Further, the grammatical structure and the meaning of a sentence may be derived using linguistic processing techniques. For example, linguistic processing techniques may be applied to determine "subject noun phrase", "action verb phrase", and "object noun phrase" and their interrelationships.

It will be apparent to a person with ordinary skill in the art that the information extracting techniques as described above may be used in combination or independently in preparation for analytic application. In various embodiments, once these techniques are applied on the data, KPI metrics 702 are generated on the basis of various analytics such as general analytics 706, custom and domain-specific analytics 708, and user analytics 710.

It may be appreciated by a person with ordinary skill in the art that various BI metrics can be performed on the ingested data that has been indexed and classified. Following are a few exemplary embodiments illustrating various BI metrics on the data collected from data sources 102. It may be noted that these embodiments are merely for exemplary purpose and there may exist other BI metrics.

Figure 8:
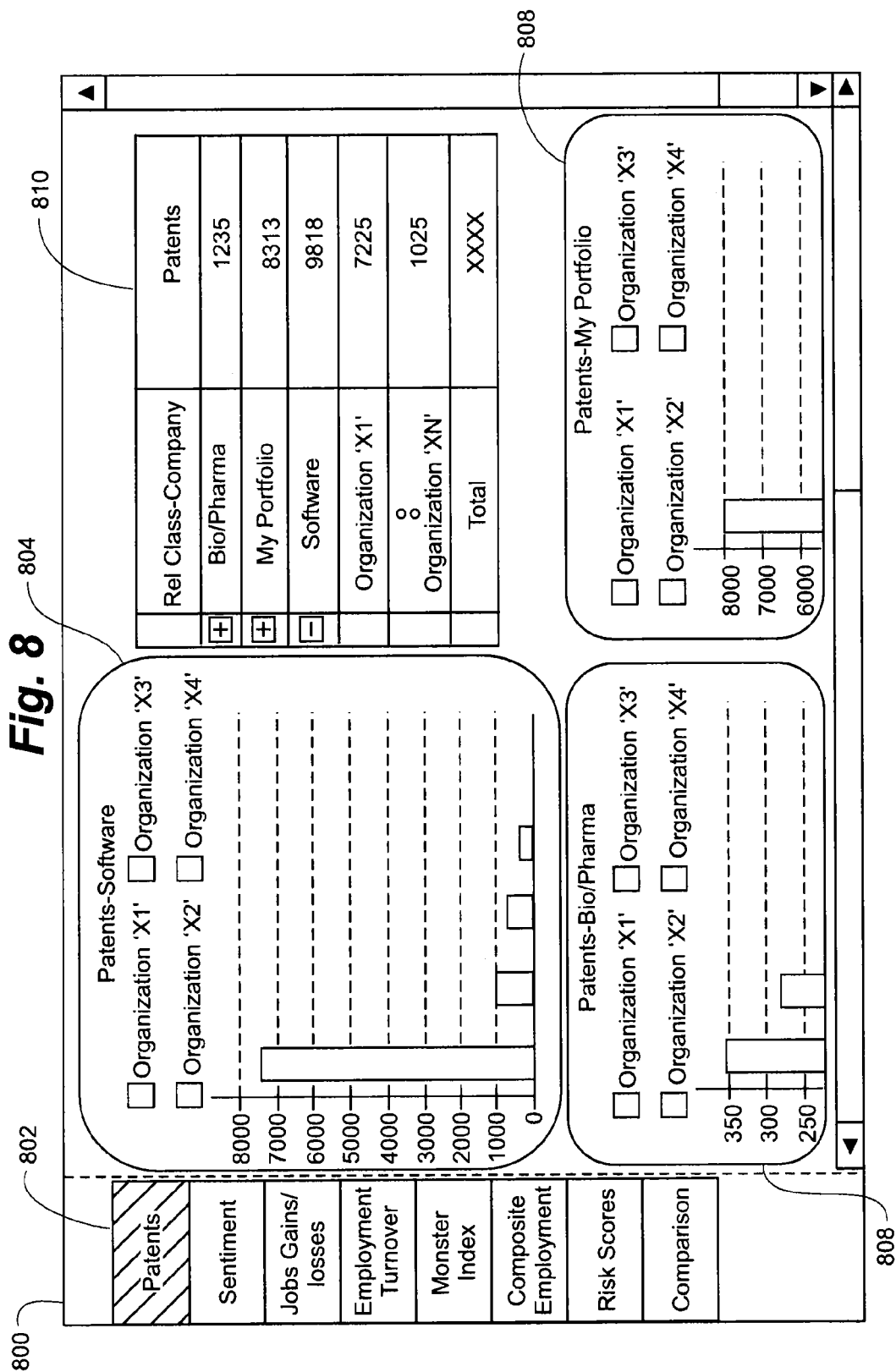
FIG. 8 is an exemplary interface illustrating the patent portfolio metric for a set of organizations, corresponding to various relevance classes, in accordance with an embodiment of the present invention.

FIG. 8 is an exemplary interface 800, illustrating patent portfolio metric for a set of organizations, corresponding to various relevance classes, in accordance with an embodiment of the present invention.

Interface 800 includes multiple icons 802, graphical representation 804 for software relevance class, graphical representation 806 for bio/pharma relevance class, graphical representation 808 for 'my portfolio' relevance class and a tabular representation depicting total number of patents 810.

Multiple icons 802 correspond to various business intelligence metrics that can be performed on a set of data and presented to a user. For example, to display the results of the patent portfolio metric, the icon "patent" is selected. Further, for each of the graphical representation 804, 806 and 808, the horizontal axis represents a predefined time duration for which the patent portfolio analysis is displayed and vertical axis represents number of patents.

In accordance with an embodiment of the present invention, the pipelined process (i.e., the steps executed from data ingestion 302 to data classification 306 as explained in conjunction with FIG. 3) runs on a regularly scheduled interval to ingest, index, and classify, for example, patent data from the USPTO for organizations X1, X2, X3, and X4. Further, the organizations X1, X2, X3, and X4 are classified into relevance classes by the user. The KPI defined is the patent portfolio analysis of the issued patents for a set of organizations (X1, X2, X3, and X4) defined by the relevance class for a predefined time duration. The analytics to generate this KPI are run as part of the pipelined process. The analytic for the patent KPI operates by parsing the patent data files aggregated from various data sources such as the USPTO web site and subsequently extracting metadata such as the company name and the date of issue from various document types, for example, HTML file, PDF file. Also, the metadata is extracted using the pattern matching technique that is explained, for example, in conjunction with FIG. 7. After the metadata is extracted, the number of patents is counted for each organization, based on the extracted metadata. Finally, graphical representations 804, 806, and 808 are generated corresponding to different relevant classes for organizations X1, X2, X3, and X4. In each of the graphical representation 804, 806 and 808, the bars represent the number of patents corresponding to each organization. Based on graphical representations 804, 806 and 808, the total number of patents 810 for the various relevant classes are identified and displayed on a dashboard of an access device operated by the user.

In various embodiments the graphical representations may be a line chart, a bar chart, a heat map, or a combination thereof.

Figure 9:
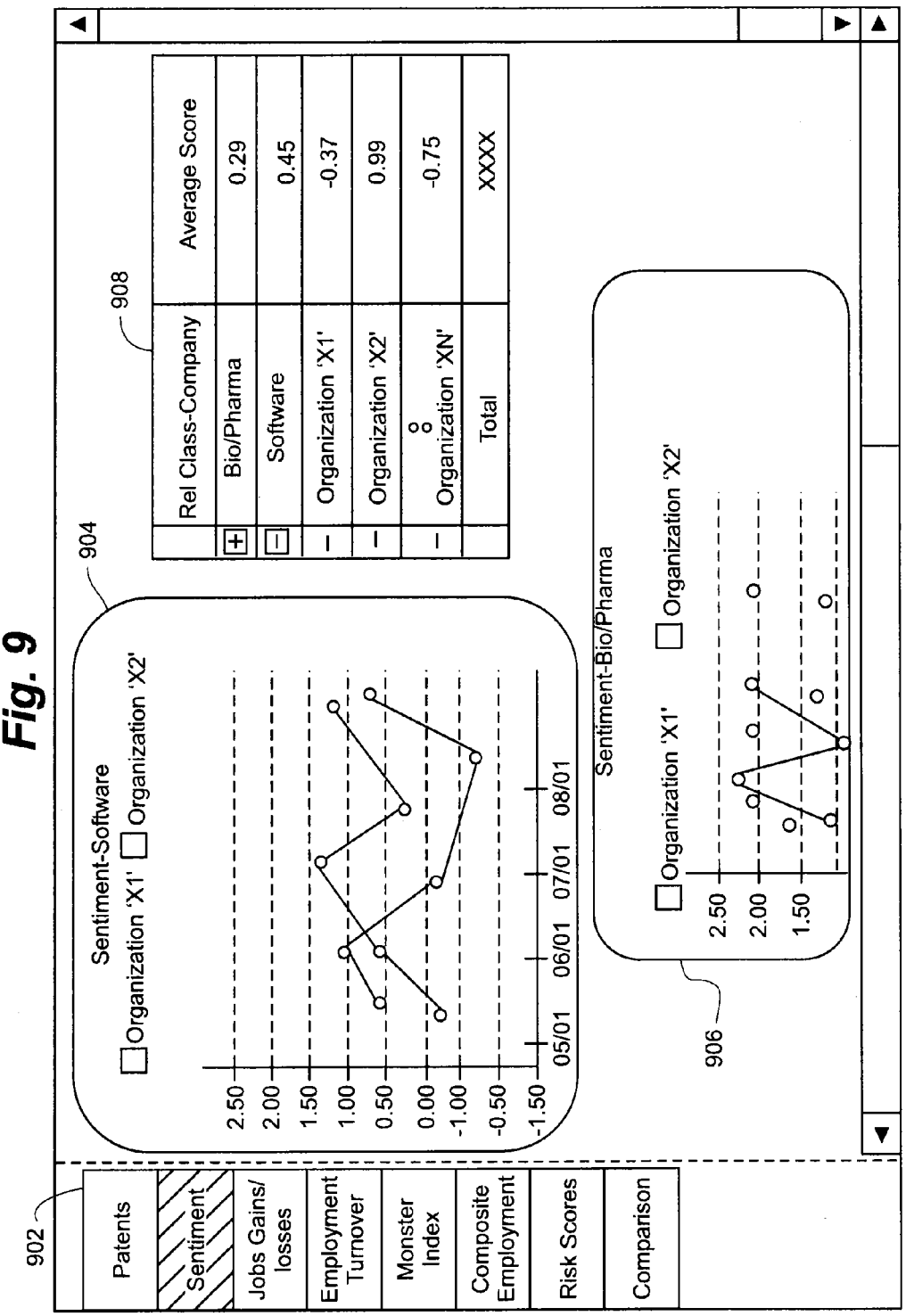
FIG. 9 is an exemplary interface illustrating the sentiment analysis metric for a set of organizations, corresponding to various relevance classes, in accordance with an embodiment of the present invention.

FIG. 9 is an exemplary interface 900, illustrating sentiment analysis for a set of organizations, corresponding to various relevance classes, in accordance with an embodiment of the present invention.

Interface 900 includes multiple icons 902, graphical representation 904 for sentiment analysis in software relevance class, graphical representation 906 for sentiment analysis in bio/pharma relevance class, and a tabular representation of the sentiment analysis scores of various organizations and relevance classes 908.

For each of graphical representations 904 and 906, the horizontal axis represents the time interval for which the data is aggregated and sentiment analysis is performed, and the vertical axis represents the corresponding score assigned to organizations X1 and X2 in various relevance classes.

The graph is generated for a set of aggregated data for a predefined time interval, for example, the sentiment analysis of the data ingested or aggregated for the time interval between May 2001 and August 2001.

In accordance with an embodiment of the present invention, any suitable time period may be defined for generating the graph. BI system 104 ingests or aggregates data for the specified time period and generates a score from the ingested or aggregated data. For example, the graph is generated every day for the purpose of intra-day trading and stock market analysis.

Further, the score may be a numerical valence assigned to the ingested or aggregated data based on the impact of the data. In certain embodiments techniques such as "share the voice" or "strength of voice" are utilized to rate the data. In one example, the score varies between a numerical value of −5 to −5.

In accordance with an embodiment of the present invention, graphical representations 904 and 906 are generated based on the basis of the Supervised Machine Learning (SML) technique. The SML is used to identify keywords and phrases from the data that is aggregated from data sources 102. Thereafter, a score ranging between −5 and +5 is assigned based on two semantic rules. First, the proximity of positive and negative words in the aggregated data with a named entity is analyzed. Further, when multiple named entities are mentioned in the data, the proximity of the sentiment-qualifying phrases is used to ensure that the sentiment-qualifying phrases are associated with the named entities. For example, for a user interested in sentiment analysis of the impact of news item (data source) on an organization 'X', news items for a predefined interval of time are aggregated. Subsequently, phrases from the news items with negative annotation associated, such as "200 employees were laid off", "200 employees were expelled", or "200 employees were asked to resign" are identified within 20 words proximity to the organizations 'X' name. These identified phrases or terms have a negative impact on the stock price of the organization. Therefore, these negative impact terms within 20 words proximity to the named entity (organization 'X') are assigned a negative score.

The second semantic rule applied for assigning a score is inversion of words so that negative impact terms are used to get the accurate sentiment. For example, inverting the sentiment score assigned terms such as 'not good' or 'not bad' according to the user's preference.

Figure 10:
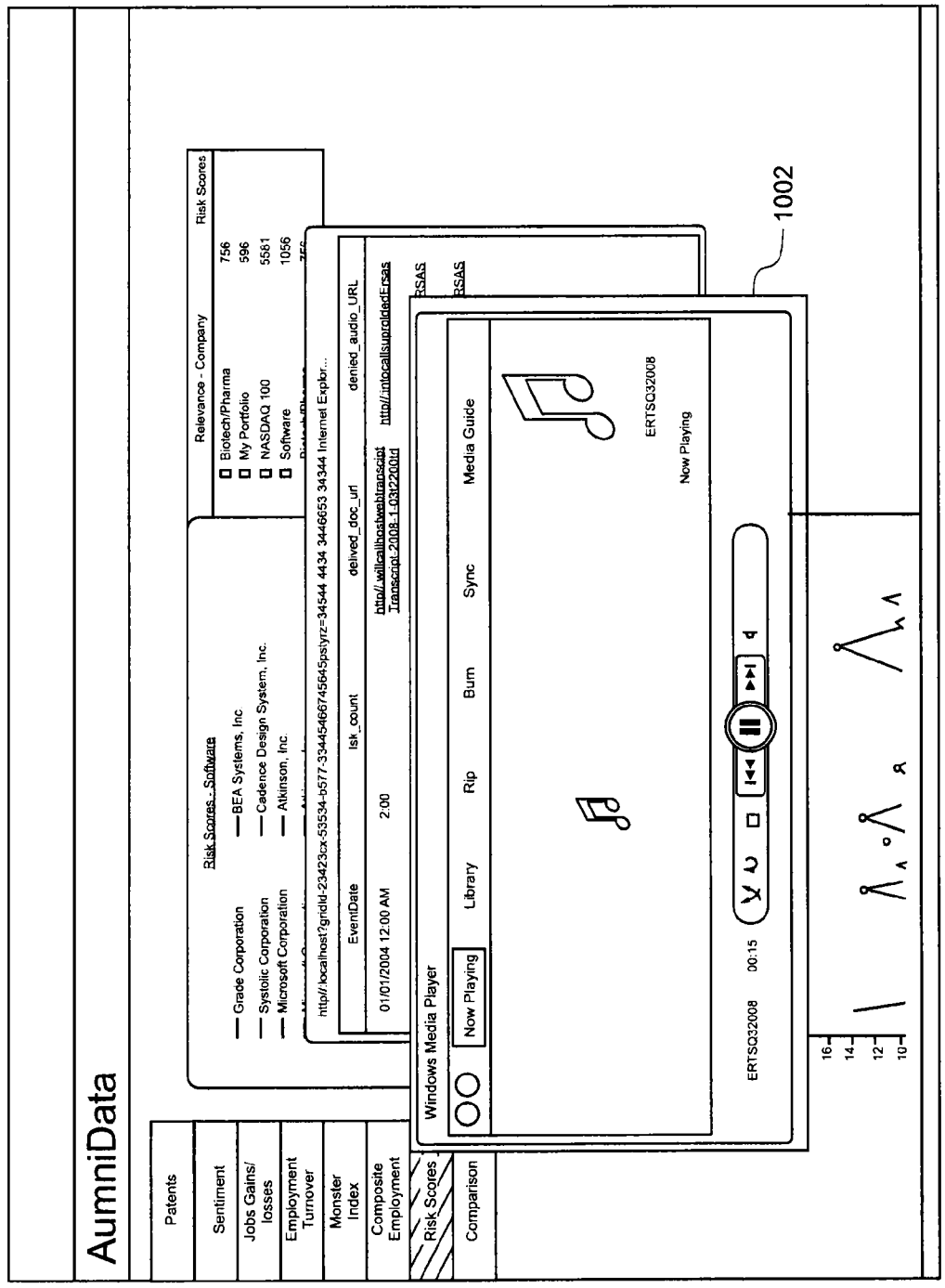
FIG. 10 is a screenshot illustrating an interface, displaying the risk score metric, in accordance with an embodiment of the present invention.

FIG. 10 is a screenshot illustrating an interface 1000, displaying risk score analysis, in accordance with an embodiment of the present invention. For exemplary purpose, the risk score analysis is shown to be performed using an audio file 1002. The risk score analysis may be graphically represented in a similar manner as the sentiment analysis (explained above in conjunction with FIG. 9). In case of risk score analysis, a risk score is assigned to an organization corresponding to a event in the organization such as mergers, acquisitions, new hires, stock grades, earnings reports, expansions, yields, profits and others.

In accordance with an embodiment of the present invention, data sources 102 for audio file 1002 can be press releases/news, quarterly calls (audio or video), call transcripts (text), etc. In this embodiment, audio file 1002 is used to assign a risk score to an organization. The KPI is the occurrence of words similar to "risk" or "uncertainty" in conference calls spoken by officers in the organization.

Risk score graph is generated by extracting the name of the organization, date of call (for audio files) for each file in transcript data source. Subsequently, keywords, such as "risk", "uncertainty", and "reduced visibility", are determined in the spoken text by the corporate officer. The number of times the word or its equivalent phrase appears in the transcript is recorded. Finally, a score value based on the keyword count is assigned to the organization. In one example, the risk score varies from a numerical value of 0 to 40.

Alternatively, for text-based files extracted from data sources 102 (such as SEC 8K filings), linguistic processing techniques are applied to identify the noun phrase, verb phrase and their interrelationship to determine the level of risk, and the risk score is then assigned.

Figure 11:
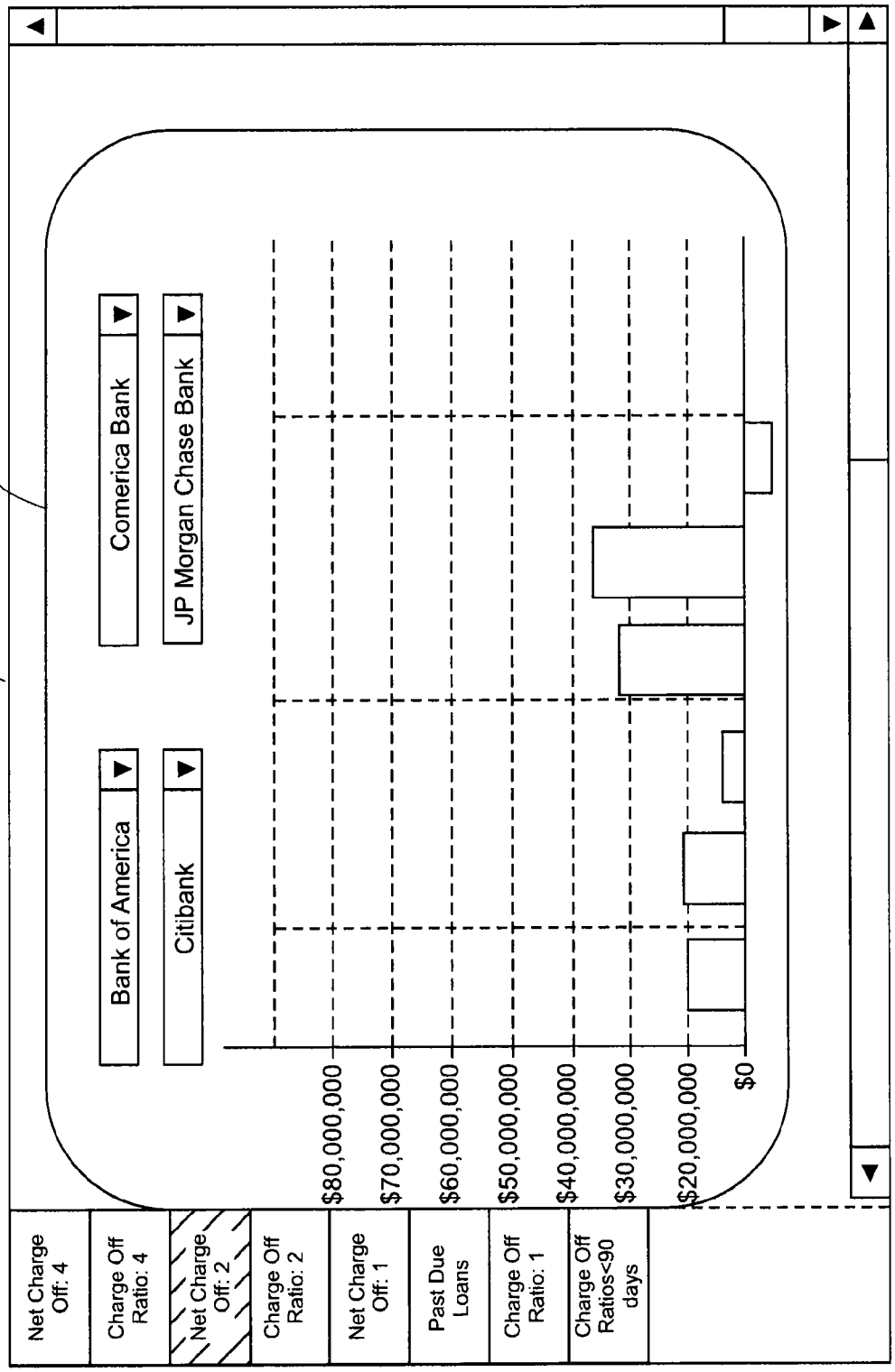
FIG. 11 is an exemplary graphical representation illustrating the bank credit worthiness metric, in accordance with an embodiment of the present invention.

FIG. 11 is an exemplary graphical representation illustrating banks credit worthiness, in accordance with an embodiment of the present invention.

The data sources for calculating a bank's credit worthiness can be Federal Deposit Insurance Corporation (FDIC) call reports, Extensible Business Reporting Language (XBRL) documents, or any other publicly available source of information related to the status of the banking system. The KPI used to generate graphs for bank credit worthiness is 'delinquencies on loan that the banks have made'. Prior to generating the graphs, a number of steps are performed. First, certain attributes such as name and address of bank, specific quarter, the values of loans from the fields of the XBRL document corresponding to a specific quarter, field values (by XBRL tag) filled in two columns (column A—Past due 30 through 89 days and still accruing and (column B—Past due 90 days or more and still accruing) are extracted from the data. Further, Net Charge Offs (NCO) are calculated from difference in the Schedule RBI-Part I fields, Charge offs and recoveries.

Graphical representation 1102 illustrates net charge off: 2 for Bank of America®, Commercial Bank®, Citibank®, and JP Morgan Chase Bank®. Similarly, charge off ratios for less than 90 days, net charge off: 1, etc., can be calculated on the same data and by following the same processing steps as described above.

Figure 12:
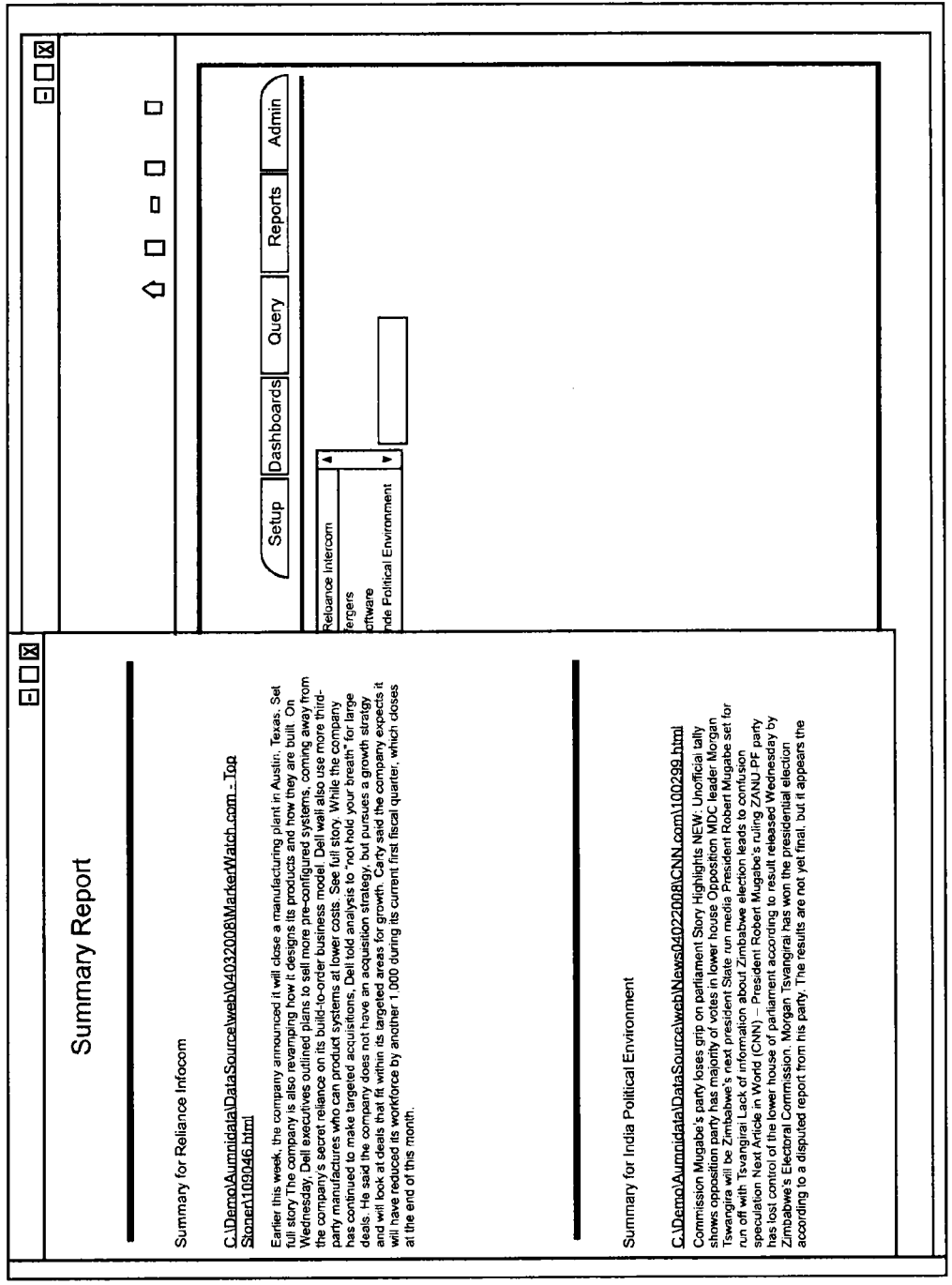
FIG. 12 is a screenshot illustrating an interface, displaying summary reports corresponding to a user's defined relevance classes, in accordance with an embodiment of the present invention.

FIG. 12 is a screenshot illustrating an interface 1200, displaying summary reports corresponding to a user's query, in accordance with an embodiment of the present invention. Interface 1200 is shown to display a summary report for "reliance infocom" and "India Political environment". However, while the display shows summary reports corresponding to two topics; it will be apparent to a person ordinarily skilled in the art that the summary report can be generated for any topic. To generate the summary report, a list of relevant snippets is extracted from data sources 102. The list of relevant snippets is identified based on the frequency of occurrence of keywords in the identified snippets. In certain embodiments, the list of snippets is organized in a reverse chronological order, i.e., the most recent published snippet or collection of snippets on the top. Finally, the user may be presented with all the relevant snippets from which the user can select or delete few snippets to generate a final summary report.

In accordance with an embodiment of the present invention, the number of snippets presented in the summary report is calculated using a predefined expression:

$$n1 = 200 N1/(N1 + N2 + \ldots Nm)$$

where n1 represents the number of snippets selected, N1 is the number of keywords found for Topic 1, N2 is the number of keywords found for Topic 2 and so forth. It is clear from the expression above that the number of snippets depends on the number of keywords that have been matched in the snippet for a topic.

Figure 13:
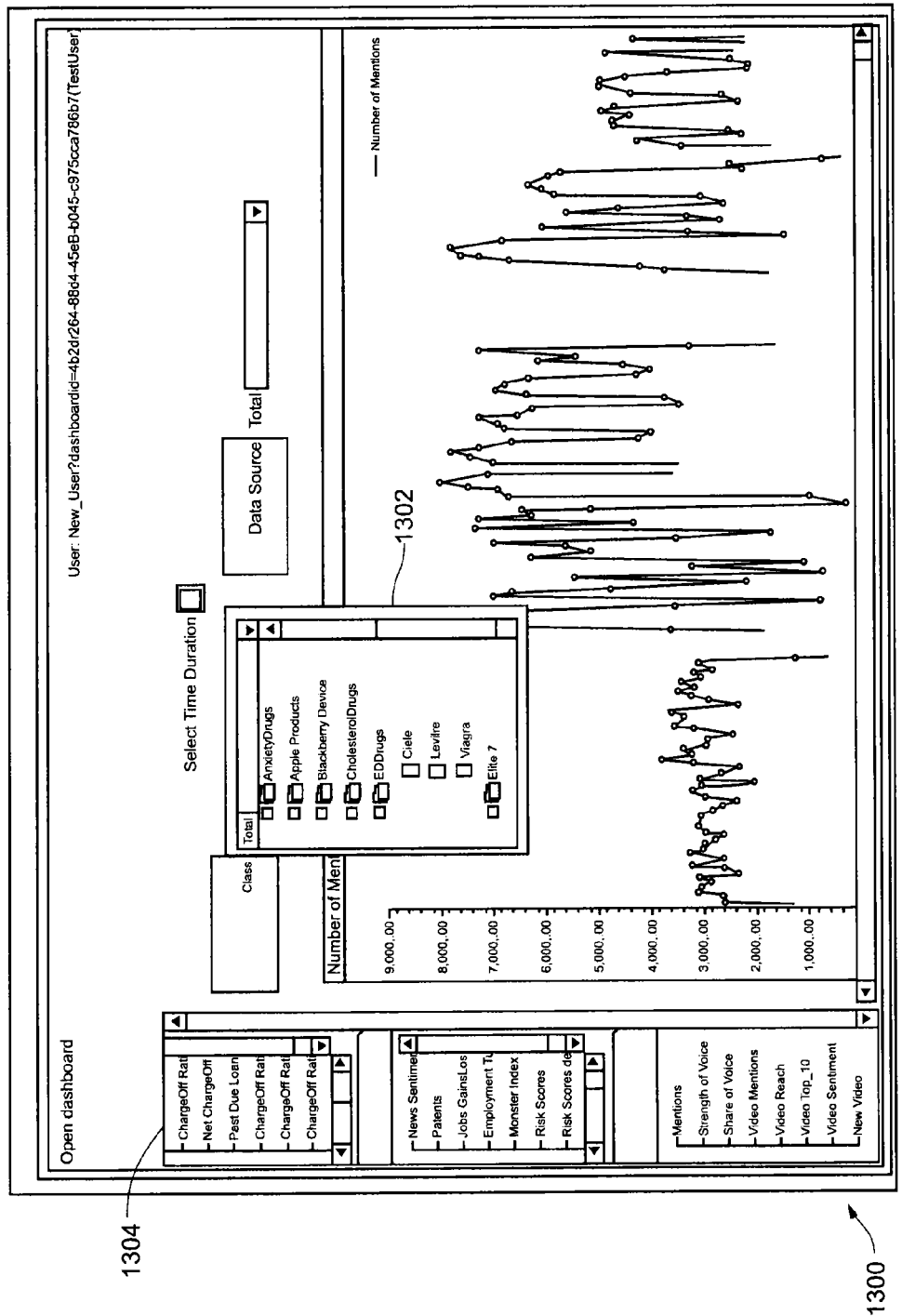
FIG. 13 is a screenshot illustrating an interface displaying different business intelligence metrics applied on the relevance classes, in accordance with an embodiment of the present invention.

FIG. 13 is a screenshot illustrating an interface 1300 displaying different analytics applied on the relevance classes, in accordance with an embodiment of the present invention. Interface 1300 includes a list of relevance classes 1302 and a set of business intelligence metrics 1304.

Relevance classes in the list of relevance classes 1302 are defined by a user or are automatically generated by BI system 104. Further, a set of business intelligence metrics 1304, such as, but not limited to, risk score analysis, sentiment analysis, and brand reputation management can be applied on each relevance class in the list of relevance classes 1302. The user of the BI system 104 may select a relevance class from the list of relevance classes 1302 and display any business intelligence metric from the set of business intelligence metrics 1304.

Various embodiments of the present invention facilitate an automated way for applying business intelligence analytics on unstructured data. The method as disclosed in the present application uses a pipelined architecture through which data is processed. After the data is processed, any business intelligence metrics such as risk score analysis, summary/report generation, sentiment analysis, etc. can be applied. Since the processing on data is performed only once and any business intelligence metric can be performed using the processed data, therefore, the overall processing overhead is reduced considerably.

Further, the present invention uses a number of data extracting techniques to extract relevant data from text and non-text documents as pertinent.

Additionally, data is classified in high-level hierarchical relevance classes, and thus, more precise concepts are extracted from the data. Consequently, there is a high degree of relevancy in the results that are presented to the user. Also, the relevance classes are updated on the basis of the user's feedbacks, therefore, the results are highly context (corresponding to user's query) specific.

By utilizing the above described system and method, various embodiments, are able to ingest, index, classify and apply various business metrics to data in a variety of forms. The data may be structured or unstructured and in various stages of processing or manipulation by alternate systems. Further, the data may be representative of real-world events such as organizational events, federal registrations and applications, social events and the like. Thus, various embodiments are able to ingest data representing real-world events and determine implicit dimensions to which various business intelligence analytics may be applied. In this way, the system and method is able ingest real-world events and transform them into business-relevant metrics that may provide various organizations and entities with information otherwise not discoverable by merely examining the real-world event and the related data.

Although the description has been described with respect to particular embodiments thereof, these particular embodiments are merely illustrative, and not restrictive. Any suitable programming language can be used to implement the routines of particular embodiments including C, C++, C#, .NET, Java, and assembly language. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

Additionally, in various embodiments the BI system 104 may be implemented on various pieces of hardware including application/web servers and database servers. For example, the data ingestion, data indexing, classification and business intelligence metric generation and reporting protocols may exist on one or a plurality of application/web servers. The application/web servers may utilize open or closed-source software including Apache Web Server, Apache Tomcat, JBoss, Microsoft® IIS, Oracle® Weblogic, IBM® Websphere. In various embodiments the application/web servers may be clustered and implement fail-over so as to ensure performance and access to the various dashboards and reports. Additionally, the data ingest servers, ingest index servers, classification server and business intelligence metric servers may be implemented on one or more database servers. The database servers may utilize relational database software such as MySQL®, Microsoft® SQLServer®, Oracle®, Postgres, Ingres®, or a combination thereof, to store data. Further, in various embodiments, non-relational databases such as document-oriented databases, Internet-facing databases, attribute-oriented databases, distributed databases, sharded sorted arrays, distributed hash table and key/value databases. Further, the database server and application/web server may utilize enterprise-class software such as Linux®, Unix® or Windows® Server operating systems. In various embodiments an application/web server is connected to the database via a distributed network utilizing various architectures such as Client-Server, N-Tier, P2P, cloud or cluster. Further, the database server and application/web server may be a standard desktop computer or may utilize high-end server-class hardware. A person having skill in the art will appreciate that the database servers and application/web servers will utilize hardware that is most appropriate for its load and performance requirements whether that be a the mini-ITX form factor, Extended ATX, blade or other configuration. Further, the database servers and application/web servers may utilize Intel or AMD, or other processors, Double Data Rate (DDR) memory, Error Correcting memory (ECC), rotational or Solid State Disk (SSD) arrays and other hardware to ensure optimum performance and reliability in operation and in processing and storing of data.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to allow a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A machine-implemented method for a pipelined process of capture, classification and dimensioning of data from a plurality of data sources that include unstructured data having no explicit dimensions associated with the unstructured data to generate a domain-relevant classified data index that is useable by a plurality of different intelligence metrics to perform different kinds of business intelligence analytics, the method comprising:

using a data processing machine to collect ingested data as one or more documents from each of the plurality of data sources that include unstructured data and automatically generate and store an ingested data index representing the ingested data that includes at least a hyperlink and extracted meta data for each document;

using a data processing machine to automatically classify each of the one or more documents into one or more relevance classifications that are stored with the ingested data index for that document to form a domain-relevant classified data index representing the ingested data, wherein the relevance classifications are based on a plurality of dynamically generated topics that are generated in response to machine analysis that includes machine-defined classifiers and in response to machine-prompted user input that distinguishes between user-defined named-entities and user-defined keywords and includes hierarchy information for establishing a hierarchical relationship among the one or more relevance classifications; and using a data processing machine to automatically process the plurality of data sources with a plurality of different intelligence metric modules independent of and after the one or more documents have been initially ingested and classified by utilizing the domain-relevant classified data index to generate analytics results that are presented for a user, including processing at least one of the documents in the ingested data with each intelligence metric module based upon a plurality of dimensions abstracted from the relevance classifications and the extracted metadata that includes at least one implicit dimension derived from one or more of the user-defined named-entities, wherein the intelligence metric modules do not modify the ingested data index, and the dynamically generated topics upon which the relevance classifications are based are not determined prior to using the data processing machine to collect ingested data based upon analytic requirements of the intelligence metric modules such that the relevance classifications are separated in the pipelined process from analytic requirements of one or more of the any given intelligence metric modules.

2. The machine-implemented method of claim 1 further comprising:

obtaining user-feedback from the user in response to the analytic results that are presented for the user; and causing a data processing machine to adaptively utilize the user-feedback to modify the relevance classifications.

3. The machine-implemented method of claim 1 wherein the plurality of data sources include text, images, video and audio and wherein using a data processing machine to collect ingested data includes:

using data source connectors to access the plurality of data sources, wherein the data source connectors include one or more of internal file system connectors, web site connectors, blog connectors, subscription connectors, email connectors, short-message-service connectors.

4. The machine-implemented method of claim 1 wherein using a data processing machine to collect ingested data includes collecting data from the plurality of data sources that include text, images, video and audio content.

5. The machine-implemented method of claim 1 using a data processing machine to collect ingested data further comprises:

using automated information extraction techniques to generate at least some of the extracted meta data for each document, wherein different automated information extraction techniques are used for different types of documents.

6. The machine-implemented method of claim 5 wherein the different automated information extraction techniques used for different types of documents include: video information extraction for video document types based on events, objects, activities or motion, image information extraction for image document types based on events, objects or activities, audio information extraction for audio type documents based on text translation or phonetics, text information extraction based on natural language processing or [SRL], or any combination thereof for documents of single or multiple types.

7. The machine-implemented method of claim 1 wherein using a data processing machine to automatically process the ingested data with the plurality of different intelligence metric modules includes:

using different data processing machines to perform different ones of the plurality of different intelligence metric modules.

8. The machine-implemented method of claim 1 wherein using a data processing machine to automatically process the ingested data with the plurality of different intelligence metric modules includes:

reprocessing the one or more documents with at least one of the intelligence metric modules.

9. The machine-implemented method of claim 1 wherein using a data processing machine to automatically process the ingested data with the plurality of different intelligence metric modules further comprises:

generating key performance indicator analytic data associated with the domain-relevant classified data index that differs for different types of documents including: video analytics for video document types based on events, objects, activities or motion, image analytics for image document types based on events, objects or activities, audio analytics for audio type documents based on text translation, phonetics or emotion extraction, text information extraction based on natural language processing, statistical processing, or event detection or, or any combination thereof for documents of single or multiple types.

10. The machine-implemented method of claim 9 wherein the plurality of different intelligence metric modules process the ingested data including the key performance indicator analytic data to generate a series of key performance indicator tables stored in a structured query language database.

11. The machine-implemented method of claim 1 wherein the plurality of different intelligence metric modules include a machine-recommended or machine-selected intelligence metric module, and a customized intelligence metric module that is defined by the user.

12. The machine-implemented method of claim 2 wherein using a data processing machine to automatically process the ingested data with the plurality of different intelligence metric modules to generate analytics results that are presented for a user includes:

providing a query user interface accessible using the data processing machine; and providing a display user interface accessible using the data processing machine.

13. The machine-implemented method of claim 12 wherein providing the query user interface accessible using the data processing machine includes:

providing a structured query user interface; and providing an ad hoc query user interface.

14. The machine-implemented method of claim 12 wherein the obtaining user-feedback from the user in response to the analytic results that are presented for the user query user interface is accomplished using the query user interface.

15. The machine-implemented method of claim 12 wherein providing the display user interface accessible using the data processing machine includes a non-text display, a report display, an alerts display, a dashboard display, or any combination thereof.

* * * * *